United States Patent
Sakurai et al.

(10) Patent No.: US 9,528,412 B2
(45) Date of Patent: Dec. 27, 2016

(54) EXHAUST GAS PURIFICATION APPARATUS FOR INTERNAL COMBUSTION ENGINE

(75) Inventors: Kenji Sakurai, Uji (JP); Yuji Miyoshi, Susono (JP); Toru Kidokoro, Hadano (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 189 days.

(21) Appl. No.: 14/409,122

(22) PCT Filed: Jun. 19, 2012

(86) PCT No.: PCT/JP2012/065593
§ 371 (c)(1),
(2), (4) Date: Feb. 27, 2015

(87) PCT Pub. No.: WO2013/190633
PCT Pub. Date: Dec. 27, 2013

(65) Prior Publication Data
US 2015/0167521 A1     Jun. 18, 2015

(51) Int. Cl.
*F01N 3/00* (2006.01)
*F01N 3/20* (2006.01)
(Continued)

(52) U.S. Cl.
CPC ............ *F01N 3/20* (2013.01); *B01D 53/9495* (2013.01); *F01N 3/0842* (2013.01);
(Continued)

(58) Field of Classification Search
CPC ........ F01N 3/20; F01N 3/2066; F01N 13/009; F01N 2610/02; F01N 3/085; F01N 3/35; F01N 3/0892
(Continued)

(56) References Cited

U.S. PATENT DOCUMENTS 6,449,291 B1 * 9/2002 Burns .................. H04J 3/0655
                                                 370/516
6,532,733 B1 * 3/2003 Tamura ................. B01D 53/92
                                                 204/164
(Continued)

FOREIGN PATENT DOCUMENTS

CN        101542083 A       9/2009
JP        2000-54887        2/2000
(Continued)

*Primary Examiner* — Tom P Duong
(74) *Attorney, Agent, or Firm* — Finnegan, Henderson, Farabow, Garrett & Dunner, LLP

(57) ABSTRACT

An exhaust gas purification catalyst is recovered from the sulfur poisoning more appropriately. For this purpose, an exhaust gas purification apparatus for an internal combustion engine selectively executes first control in which an air-fuel ratio of an exhaust gas allowed to flow into an exhaust gas purification catalyst is set to be not more than a theoretical air-fuel ratio to remove a sulfur component from the exhaust gas purification catalyst; and second control in which the air-fuel ratio of the exhaust gas allowed to flow into the exhaust gas purification catalyst is set to an air-fuel ratio that is lower than the air-fuel ratio of the exhaust gas set in the first control to remove the sulfur component from the exhaust gas purification catalyst; wherein the exhaust gas purification apparatus for the internal combustion engine comprises a control unit which executes any one of the first control and the second control on the basis of at least one of purification performance of the exhaust gas purification catalyst, a travel distance of a vehicle that carries the internal combustion engine, and a number of times of removal of the sulfur component from the exhaust gas purification catalyst.

6 Claims, 13 Drawing Sheets

(51) Int. Cl.
  *F01N 3/08* (2006.01)
  *F01N 9/00* (2006.01)
  *F01N 13/00* (2010.01)
  *B01D 53/94* (2006.01)
  *F01N 3/22* (2006.01)

(52) U.S. Cl.
  CPC ......... *F01N 3/0885* (2013.01); *F01N 3/2066* (2013.01); *F01N 3/22* (2013.01); *F01N 9/00* (2013.01); *F01N 13/009* (2014.06); *F01N 2610/02* (2013.01); *Y02T 10/24* (2013.01); *Y02T 10/47* (2013.01)

(58) Field of Classification Search
  USPC .......................... 60/285, 274, 284, 288, 300
  See application file for complete search history.

(56) References Cited

U.S. PATENT DOCUMENTS

| | | | |
|---|---|---|---|
| 6,698,187 B2 * | 3/2004 | Nishioka | F01N 3/0842 60/274 |
| 7,454,900 B2 * | 11/2008 | Hayashi | B01D 53/9409 60/274 |
| 2005/0028515 A1 * | 2/2005 | Fukuma | F02M 26/42 60/276 |
| 2005/0050884 A1 * | 3/2005 | Nagaoka | F02D 41/028 60/295 |
| 2009/0145113 A1 | 6/2009 | Yoshida et al. | |
| 2010/0115924 A1 * | 5/2010 | Gabe | B01D 53/9409 60/285 |

FOREIGN PATENT DOCUMENTS

| | | |
|---|---|---|
| JP | 2000-161107 A | 6/2000 |
| JP | 2001-55919 | 2/2001 |
| JP | 2004-52597 | 2/2004 |
| JP | 2005-42734 | 2/2005 |
| JP | 2006-207487 | 8/2006 |
| JP | 2008-223679 | 9/2008 |
| JP | 2010-112198 A | 5/2010 |
| JP | 2010-127179 A | 6/2010 |
| JP | 2010-203320 | 9/2010 |
| JP | 2010-223076 | 10/2010 |
| JP | 2012-57571 | 3/2012 |

* cited by examiner

SULFUR POISONING

SULFUR POISONING

NOx

NOx

EXHAUST GAS PURIFICATION APPARATUS FOR INTERNAL COMBUSTION ENGINE

CROSS-REFERENCE TO RELATED APPLICATIONS

This application is a national phase application of International Application No. PCT/JP2012/065593, filed Jun. 19, 2012, the content of which is incorporated herein by reference.

TECHNICAL FIELD

The present invention relates to an exhaust gas purification apparatus for an internal combustion engine.

BACKGROUND ART

Such a technique is known that a storage reduction NOx catalyst (NOx storage reduction catalyst) (hereinafter referred to as "NSR catalyst" as well) is arranged at an exhaust gas passage of an internal combustion engine. The NSR catalyst occludes (absorbs or stores) NOx contained in the exhaust gas when the oxygen concentration of the inflow exhaust gas is high, while the NSR catalyst reduces the occluded NOx when the oxygen concentration of the inflow exhaust gas is decreased and the reducing agent is present.

The sulfur component (SOx), which is contained in the fuel, is also occluded by the NSR catalyst in the same manner as NOx. SOx, which is stored or occluded as described above, is hardly released as compared with NOx, and SOx is accumulated in the NSR catalyst. This phenomenon is referred to as "sulfur poisoning". The NOx purification rate of the NSR catalyst is lowered or decreased by the sulfur poisoning. Therefore, it is necessary to apply the sulfur poisoning recovery process at any appropriate timing. The sulfur poisoning recovery process is performed such that the exhaust gas, which is obtained by the combustion at a rich air-fuel ratio in the internal combustion engine, is allowed to flow through the NSR catalyst.

In this context, such a technique is known that the sulfur poisoning recovery process is carried out when the SOx amount allowed to flow into the NSR catalyst exceeds a predetermined amount, and a substantially total amount of the accumulated SOx is released (see, for example, Patent Document 1).

Further, such a technique is known that the timing, at which the sulfur poisoning recovery process is carried out, is determined on the basis of the maximum NOx amount capable of being occluded by the NSR catalyst (see, for example, Patent Document 2).

Further, such a technique is known that the NOx catalyst is divided into a plurality of portions in the flow direction of the exhaust gas, the deterioration state is calculated for each of the portions, and the deterioration state of the entire NOx catalyst is calculated from the deterioration states of the respective portions (see, for example, Patent Document 3).

Further, such a technique is known that a series of control operations, in which the air-fuel ratio of the exhaust gas allowed to flow into the NOx catalyst is switched from the lean side to the rich side, the air-fuel ratio is once returned to the lean side for a predetermined time, and the air-fuel ratio is switched to the rich side again, are executed at least once, and thus the sulfur component accumulated in the NOx catalyst is purified (see, for example, Patent Document 4).

Further, such a technique is known that the purification of the sulfur component accumulated in the NOx catalyst and the removal of PM collected by a filter disposed on the downstream side from the NOx catalyst are performed simultaneously by changing the air-fuel ratio of the exhaust gas allowed to flow into the NOx catalyst from the lean side to the rich side, and the target air-fuel ratio is changed from the first target air-fuel ratio as the rich air-fuel ratio to the second target air-fuel ratio as the air-fuel ratio lower than the above if the air-fuel ratio of the exhaust gas allowed to flow into the filter is lower than a predetermined threshold value (see, for example, Patent Document 5).

In the meantime, in order to release the total amount of the sulfur component occluded by the NSR catalyst during the sulfur poisoning recovery process for the NSR catalyst, it is necessary that the air-fuel ratio of the exhaust gas should be lowered, for example, to about 12.5. Therefore, it is feared that the amounts of emission of HC and CO may be increased. Further, when the air-fuel ratio of the exhaust gas is lowered, it is feared that the fuel efficiency (fuel consumption) may be deteriorated thereby. Further, when the sulfur poisoning recovery process is carried out while lowering the air-fuel ratio of the exhaust gas, it is also feared that $H_2S$ may be produced. For the reason as described above, the sulfur poisoning recovery process is carried out for the NSR catalyst while setting the air-fuel ratio of the exhaust gas, for example, to about 14.3. That is, the sulfur poisoning recovery process is carried out at the air-fuel ratio which is approximate to the theoretical air-fuel ratio although the air-fuel ratio is the rich air-fuel ratio. However, when the sulfur poisoning recovery process is carried out for the NSR catalyst while setting the air-fuel ratio of the exhaust gas, for example, to about 14.3, a part of the sulfur component occluded by the NSR catalyst cannot be removed, and the part of the sulfur component remains. When the sulfur component remaining in the NSR catalyst is gradually increased, the purification performance of the NSR catalyst is gradually lowered thereby.

PRECEDING TECHNICAL DOCUMENTS

Patent Documents

Patent Document 1: JP2005-042734A;
Patent Document 2: JP2001-055919A;
Patent Document 3: JP2008-223679A;
Patent Document 4: JP2010-223076A;
Patent Document 5: JP2010-203320A.

SUMMARY OF THE INVENTION

Task to be Solved by the Invention

The present invention has been made taking the foregoing problems into consideration, an object of which is to recover or restore an exhaust gas purification catalyst from the sulfur poisoning more appropriately.

Solution for the Task

In order to achieve the object as described above, according to the present invention, there is provided an exhaust gas purification apparatus for an internal combustion engine comprising:

an exhaust gas purification catalyst which is provided at an exhaust gas passage of the internal combustion engine, for selectively executing:

first control in which an air-fuel ratio of an exhaust gas allowed to flow into the exhaust gas purification catalyst is set to be not more than a theoretical air-fuel ratio to remove a sulfur component from the exhaust gas purification catalyst; and second control in which the air-fuel ratio of the exhaust gas allowed to flow into the exhaust gas purification catalyst is set to an air-fuel ratio that is lower than the air-fuel ratio of the exhaust gas set in the first control to remove the sulfur component from the exhaust gas purification catalyst, the exhaust gas purification apparatus for the internal combustion engine further comprising:

a control unit which executes any one of the first control and the second control on the basis of at least one of purification performance of the exhaust gas purification catalyst, a travel distance of a vehicle that carries the internal combustion engine, and a number of times of removal of the sulfur component from the exhaust gas purification catalyst when the sulfur component is removed from the exhaust gas purification catalyst.

In this context, the exhaust gas purification catalyst is the catalyst in which the purification performance is decreased by the sulfur component contained in the exhaust gas. According to the first control and the second control, the sulfur component is removed. However, according to the second control in which the air-fuel ratio is more lowered, it is possible to remove a larger amount of the sulfur component. That is, even when the sulfur component is removed from the exhaust gas purification catalyst in accordance with the first control, a part of the sulfur component remains in the exhaust gas purification catalyst. However, if the sulfur component is removed by means of only the second control, the amounts of emission of HC, CO, and $H_2S$ are increased.

In view of the above, the control unit executes any one of the first control and the second control when the sulfur poisoning recovery process is carried out for the exhaust gas purification catalyst. For example, in order to suppress the amounts of emission of the HC, CO, and $H_2S$, the sulfur component is ordinarily removed in accordance with the first control. Then, when a large amount of the sulfur component is accumulated in the exhaust gas purification catalyst, it is also allowable to remove the sulfur component in accordance with the second control.

In this procedure, the purification performance of the exhaust gas purification catalyst, the travel distance of the vehicle on which the internal combustion engine is carried, and the number of times of removal of the sulfur component from the exhaust gas purification catalyst are correlated with the amount of the sulfur component accumulated in the exhaust gas purification catalyst.

That is, the larger the amount of the sulfur component accumulated in the exhaust gas purification catalyst is, the more lowered the purification performance of the exhaust gas purification catalyst is. For example, if the purification performance of the exhaust gas purification catalyst is relatively high, it is appropriate to execute the first control. On the other hand, if the purification performance of the exhaust gas purification catalyst is relatively low, it is considered that a large amount of the sulfur component is accumulated in the exhaust gas purification catalyst. Therefore, the second control is executed. Further, it is also appropriate to execute the first control or the second control by acquiring a physical quantity correlated with the purification performance of the exhaust gas purification catalyst, and comparing the physical quantity with a threshold value.

Further, if the travel distance of the vehicle on which the internal combustion engine is carried becomes long, a larger amount of the sulfur component is accumulated in the exhaust gas purification catalyst. Therefore, it is appropriate to execute the first control during the period in which the travel distance of the vehicle is relatively short. On the other hand, if the travel distance of the vehicle is relatively long, the accumulation amount of the sulfur component is increased. If the second control is executed in such a situation, it is possible to remove a larger amount of the sulfur component accumulated in the exhaust gas purification catalyst.

Further, even when the sulfur component is removed in accordance with the first control, if the number of times of removal is increased, then the amount of the sulfur component, which is accumulated without being removed, is increased. Therefore, for example, it is also appropriate to execute the second control after the number of times of execution of the first control becomes a prescribed value.

The purification performance of the exhaust gas purification catalyst is recovered or restored after the sulfur component is removed by means of the second control. Therefore, it is appropriate to execute the first control thereafter.

As described above, when the two means are provided to remove the sulfur component from the exhaust gas purification catalyst, and any one of them is executed depending on the situation provided at that time, then it is possible to recover the exhaust gas purification catalyst from the sulfur poisoning more appropriately.

Further, in the present invention, the control unit can raise a frequency of execution of the first control as compared with a frequency of execution of the second control.

In this context, it is enough to execute the first control until a large amount of the sulfur component is accumulated in the exhaust gas purification catalyst. Therefore, it is appropriate to raise the frequency of execution of the first control. Then, it is appropriate to execute the second control when the sulfur component incapable of being removed by the first control is increased. When the frequency of execution of the first control is raised as described above, it is thereby possible to reduce the amount of emission of HC or the like while suppressing the decrease in the purification rate of NOx.

Further, in the present invention, the control unit can execute the second control continuously after the first control when the second control is executed.

That is, it is also appropriate to remove the sulfur component in accordance with the first control immediately before removing the sulfur component in accordance with the second control. In this procedure, when the sulfur component is removed in accordance with the second control, $H_2S$ is easily produced because the air-fuel ratio is low. Further, the larger the amount of the sulfur component accumulated when the sulfur component is removed in accordance with the second control is, the larger the amount of production of $H_2S$ is. Further, even when it is necessary to remove the sulfur component in accordance with the second control, the sulfur component, which can be removed in accordance with the first control at that time, is also occluded or stored by the exhaust gas purification catalyst. In view of the above, if the sulfur component, which can be removed in accordance with the first control, is removed by the first control, and the sulfur component, which cannot be removed in accordance with the first control, is thereafter removed by the second control, then it is possible to decrease the amounts of emission of the HC and CO, and it is possible to decrease the amount of production of $H_2S$.

Further, in the present invention, the control unit can execute the first control if the purification performance of the exhaust gas purification catalyst is not less than a threshold value, while the control unit can execute the second control if the purification performance of the exhaust gas purification catalyst is less than the threshold value.

In this context, if the amount of the sulfur component accumulated in the exhaust gas purification catalyst is excessively increased, the NOx purification rate of the entire system is without the allowable range even when the first control is repeatedly carried out. On the contrary, when the first control is executed if the purification performance of the exhaust gas purification catalyst is not less than the threshold value, and the second control is executed if the purification performance of the exhaust gas purification catalyst is less than the threshold value, then it is possible to suppress such a situation that the NOx purification rate is without the allowable range. That is, the threshold value can be the lower limit value of the purification performance of the exhaust gas purification catalyst at which the NOx purification rate is within the allowable range by executing the first control. It is also appropriate that the threshold value is a value which has a certain degree of margin or allowance.

Further, in the present invention, the control unit can determine the purification performance of the exhaust gas purification catalyst on the basis of at least one of a NOx purification rate of the exhaust gas purification catalyst, a NOx occlusion amount of the exhaust gas purification catalyst, an oxygen occlusion amount of the exhaust gas purification catalyst, and an $NH_3$ production amount of the exhaust gas purification catalyst.

In this context, it is also appropriate to consider that the purification performance of the exhaust gas purification catalyst is the performance of the exhaust gas purification catalyst to purify NOx. Further, the NOx purification rate is the ratio of NOx to be purified by the exhaust gas purification catalyst with respect to NOx allowed to flow into the exhaust gas purification catalyst. Further, it is also appropriate that the NOx occlusion amount is, for example, the NOx amount maximally occludable (capable of being occluded) by the exhaust gas purification catalyst. In this procedure, even when the first control is repeatedly executed, then the sulfur component is gradually accumulated, and thus the NOx purification rate, the NOx occlusion amount, the oxygen occlusion amount, and the $NH_3$ production amount are gradually decreased. In relation thereto, it is possible to recover or restore the NOx purification rate, the NOx occlusion amount, the oxygen occlusion amount, or the $NH_3$ production amount by executing the second control if the NOx purification rate, the NOx occlusion amount, the oxygen occlusion amount, or the $NH_3$ production amount is decreased. For example, it is also appropriate that the first control is executed if the NOx purification rate, the NOx occlusion amount, the oxygen occlusion amount, or the $NH_3$ production amount is not less than the threshold value, while the second control is executed if the NOx purification rate, the NOx occlusion amount, the oxygen occlusion amount, or the $NH_3$ production amount is less than the threshold value.

Further, in the present invention, the exhaust gas purification apparatus can further comprise a selective catalytic reduction NOx catalyst which is provided on a downstream side from the exhaust gas purification catalyst and which uses $NH_3$ as a reducing agent.

The exhaust gas purification catalyst may be a storage reduction NOx catalyst (NOx storage reduction catalyst) (NSR catalyst). The NSR catalyst reduces NOx when the air-fuel ratio is the rich air-fuel ratio, and the NSR catalyst allows, for example, $H_2$ or HC to react with NO so that $NH_3$ is produced. That is, $NH_3$ is produced when the air-fuel ratio of the exhaust gas is the rich air-fuel ratio. It is possible to produce $NH_3$ even when any other catalyst (for example, a three way catalyst) other than the NSR catalyst is used. The selective catalytic reduction NOx catalyst (SCR catalyst) adsorbs $NH_3$, and NOx is reduced with $NH_3$.

Therefore, $NH_3$ is produced by the NSR catalyst by allowing the air-fuel ratio of the exhaust gas to be the rich air-fuel ratio when NOx is occluded by the NSR catalyst. Further, it is possible to supply HC or the like as the reducing agent to the NSR catalyst by allowing the air-fuel ratio of the exhaust gas to be the rich air-fuel ratio. NOx, which has been stored or occluded by the NSR catalyst, is reduced by the reducing agent. That is, NOx is purified by the NSR catalyst by providing the rich air-fuel ratio.

In this procedure, when the air-fuel ratio of the exhaust gas is switched from the lean to the rich in a state in which the occlusion amount of NOx is smaller, the NOx purification rate of the NSR catalyst is enhanced or raised. Further, when the air-fuel ratio of the exhaust gas is switched from the lean to the rich in a state in which the occlusion amount of NOx is larger, the NOx purification rate of the SCR catalyst is enhanced or raised.

For example, the larger the amount of NOx occluded by the NSR catalyst is, the more easily caused the reaction to produce $NH_3$ is, when the rich air-fuel ratio is provided. Therefore, the amount of produced $NH_3$ is increased. When the production amount of $NH_3$ is increased, a larger amount of the reducing agent can be supplied to the SCR catalyst. Therefore, the NOx purification rate of the SCR catalyst is raised. That is, in order to raise the NOx purification rate of the SCR catalyst, it is preferable to maintain the state in which the amount of NOx occluded by the NSR catalyst is large.

On the other hand, if the air-fuel ratio of the exhaust gas is switched from the lean to the rich in a state in which the occlusion amount of NOx is smaller, then the production amount of $NH_3$ is decreased. Accordingly, the amount of the reducing agent supplied to the SCR catalyst is decreased. Therefore, the NOx purification rate of the SCR catalyst is lowered. The occlusion amount of NOx is correlated with the time for which the lean air-fuel ratio is provided. That is, when the time, for which the lean air-fuel ratio is provided, is shortened, the production amount of $NH_3$ is decreased thereby. This situation is also expressed such that the production amount of $NH_3$ is decreased by shortening the interval at which the rich air-fuel ratio is provided.

Further, when the air-fuel ratio of the exhaust gas is switched from the lean to the rich in a state in which the amount of NOx occluded by the NSR catalyst is small, the NOx purification rate of the NSR catalyst is raised. That is, in order to raise the NOx purification rate of the NSR catalyst, it is preferable to maintain the state in which the amount of NOx occluded by the NSR catalyst is small. For example, it is appropriate to switch the air-fuel ratio of the exhaust gas from the lean to the rich in a state in which the amount of NOx is small when NOx occluded by the NSR catalyst is reduced. In this way, the state, in which NOx is easily occluded, can be rather maintained by maintaining the state in which the occlusion amount of NOx is small by frequently reducing NOx by shortening the interval at which the rich air-fuel ratio is provided. Therefore, the NOx purification rate of the NSR catalyst is raised. On the other hand, if the NOx occlusion amount is increased in the NSR catalyst, then NOx is hardly occluded, and the NOx purification rate of the NSR catalyst is decreased.

As described above, the condition, which is required to raise the NOx purification rate in the NSR catalyst, is different from the condition which is required to raise the NOx purification rate in the SCR catalyst. However, if the sulfur component, which cannot be removed by the first control, is increased in the NSR catalyst, then the NOx purification rate of the NSR catalyst is lowered, and the production amount of the $NH_3$ is decreased as well. Accordingly, it is feared that the NOx purification rate of the SCR catalyst may be lowered as well.

Further, the timings, at which the first control and the second control are executed, can be determined by considering, for example, the decrease in the NOx occlusion ability caused by the accumulation in the NSR catalyst of the sulfur component which cannot be removed by the first control, the deterioration of the fuel efficiency (fuel consumption) caused by the decrease in the air-fuel ratio, and the decrease in the NOx purification rate of the SCR catalyst caused by the decrease in the $NH_3$ production amount. That is, as the sulfur component, which cannot be removed by the first control, is more increased, the amount of NOx maximally occludable by the NSR catalyst is more decreased. Further, the interval, which is most appropriate to provide the rich air-fuel ratio in order to reduce NOx occluded by the NSR catalyst, is changed. It is also appropriate that the time, for which the lean air-fuel ratio is provided, is more shortened, as the amount of NOx maximally occludable by the NSR catalyst is more decreased. That is, it is also appropriate to maintain the state in which the amount of NOx occluded by the NSR catalyst is small, by frequently providing the rich air-fuel ratio.

In the present invention, the exhaust gas purification apparatus can further comprise:

a coefficient calculating unit which calculates a distribution coefficient on the basis of an operation state of the internal combustion engine, while dividing the exhaust gas purification catalyst into a plurality of portions in a flow direction of the exhaust gas and in a radial direction, the distribution coefficient being correlated with an amount of the sulfur component occluded by each of the portions;

a purification performance of each portion calculating unit which calculates the purification performance of each of the portions from the distribution coefficient calculated by the coefficient calculating unit; and an entire purification performance calculating unit which calculates the purification performance of the entire exhaust gas purification catalyst from the purification performance of each of the portions calculated by the purification performance of each portion calculating unit.

In this context, the exhaust gas, which flows into the exhaust gas purification catalyst, flows while being more spread in the radial direction of the exhaust gas purification catalyst as the space velocity (SV) is more lowered. That is, the exhaust gas flows uniformly with respect to the exhaust gas purification catalyst. As a result, when SV is low, the sulfur poisoning arises in a wide range in the radial direction. Further, the sulfur component is scattered or dispersed in the radial direction, and hence the sulfur poisoning arises principally on the upstream side of the exhaust gas purification catalyst.

On the other hand, when SV is high, the exhaust gas flows in the vicinity of the central axis of the exhaust gas purification catalyst. That is, the exhaust gas flows, while being biased or deviated with respect to the exhaust gas purification catalyst. As a result, when SV is high, the sulfur poisoning occurs principally in the vicinity of the central axis of the exhaust gas purification catalyst. Further, the sulfur component flows in a concentrated manner in the vicinity of the central axis of the exhaust gas purification catalyst. Therefore, the sulfur poisoning occurs in a wider range in the flow direction of the exhaust gas.

In this way, when SV is more raised, then the range, in which the sulfur poisoning occurs, is more biased toward the central axis side of the exhaust gas purification catalyst, and the range extends toward the more downstream side. This situation also arises in relation to the range in which NOx is occluded, in the same manner as described above. It is also appropriate that the space velocity (SV) is the velocity of the exhaust gas.

When SV is low, NOx is dispersed in the radial direction of the exhaust gas purification catalyst. Therefore, it is possible to occlude NOx in the wide range in the radial direction of the exhaust gas purification catalyst. Therefore, even when the occlusion amount of the sulfur component is relatively large, it is possible to occlude NOx.

On the other hand, when SV is high, NOx is occluded in a concentrated manner in the vicinity of the central axis of the exhaust gas purification catalyst. Therefore, if a large amount of the sulfur component is occluded in the vicinity of the central axis, the portion, which can occlude NOx, is narrowed. In such a situation, NOx can be occluded only when the occlusion amount of the sulfur component is relatively small.

In this context, SV is changed depending on the operation state (for example, the load) of the internal combustion engine. Further, when the exhaust gas purification catalyst is divided into the plurality of portions in the flow direction of the exhaust gas and in the radial direction, the amount of the exhaust gas allowed to flow through each of the portions is changed depending on the operation state of the internal combustion engine. Therefore, the amount of the sulfur component occluded by each of the portions is also changed depending on the operation state of the internal combustion engine. The distribution coefficient is calculated as the value which is correlated with the amount of the sulfur component occluded by each of the portions.

The purification performance of each of the portions is changed depending on the distribution coefficient. Therefore, when the distribution coefficient is used, it is possible to estimate the purification performance of each of the portions. Therefore, it is also possible to estimate the purification performance of the entire exhaust gas purification catalyst on the basis thereof. The purification performance of the entire exhaust gas purification catalyst estimated as described above is the purification performance for which the portion of occlusion of the sulfur component is taken into consideration. This is approximate to the actual purification performance as compared with the purification performance which is calculated on the basis of only the occlusion amount of the sulfur component. Therefore, it is possible to more appropriately set the timing at which the sulfur poisoning recovery process is carried out and the timing at which NOx is reduced. Further, the sulfur component, which is accumulated without being completely removed by the first control, can be also calculated for each of the portions. Therefore, the accuracy of execution of the first control or the second control is raised as well. It is also appropriate that the temperature of each of the portions is also considered in combination to estimate the purification performance of each of the portions.

Effect of the Invention

According to the present invention, it is possible to more appropriately recover the exhaust gas purification catalyst from the sulfur poisoning.

MODE FOR CARRYING OUT THE INVENTION

An explanation will be made below on the basis of the drawings about a specified embodiment of the exhaust gas purification apparatus for the internal combustion engine according to the present invention.

First Embodiment

Figure 1:
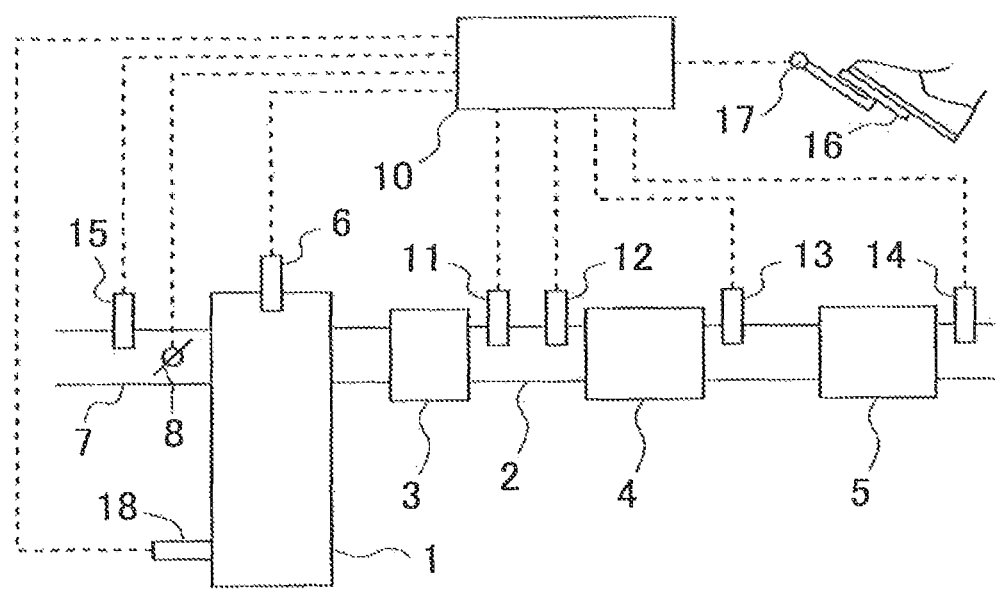
FIG. 1 shows a schematic arrangement of an internal combustion engine according to an embodiment and an intake system and an exhaust system thereof.

FIG. 1 shows a schematic arrangement of an internal combustion engine, and an intake system and an exhaust system thereof according to this embodiment. The internal combustion engine 1 shown in FIG. 1 is a gasoline engine. However, it is also allowable that the internal combustion engine 1 shown in FIG. 1 is a diesel engine. The internal combustion engine 1 is carried, for example, on a vehicle.

An exhaust gas passage 2 is connected to the internal combustion engine 1. A three way catalyst 3, a storage reduction NOx catalyst (NOx storage reduction catalyst) 4 (hereinafter referred to as "NSR catalyst 4"), and a selective catalytic reduction NOx catalyst 5 (hereinafter referred to as "SCR catalyst 5") are provided in this order from the upstream side at intermediate positions of the exhaust gas passage 2.

The three way catalyst 3 purifies NOx, HC, and CO at the maximum efficiency when the catalyst atmosphere resides in the theoretical air-fuel ratio. Further, the three way catalyst 3 has the oxygen storage ability. That is, the exhaust gas is purified by storing or occluding a surplus or excessive amount of oxygen when the air-fuel ratio of the inflow exhaust gas is the lean air-fuel ratio, and releasing a deficit or insufficient amount of oxygen when the air-fuel ratio of the inflow exhaust gas is the rich air-fuel ratio. Owing to the action of the oxygen storage ability as described above, the three way catalyst 3 can purify HC, CO, and NOx at any air-fuel ratio other than the theoretical air-fuel ratio.

It is also possible to allow the three way catalyst 3 to have such a function that NOx contained in the exhaust gas is occluded when the oxygen concentration of the inflow exhaust gas is high, while occluded NOx is reduced when the oxygen concentration of the inflow exhaust gas is decreased and the reducing agent is present. In this case, it is also allowable that the NSR catalyst 4 is absent.

Further, the NSR catalyst 4 occludes NOx contained in the exhaust gas when the oxygen concentration of the inflow exhaust gas is high, while the NSR catalyst 4 reduces occluded NOx when the oxygen concentration of the inflow exhaust gas is lowered and the reducing agent is present. HC or CO, which is the unburned fuel emitted or discharged from the internal combustion engine 1, can be utilized as the reducing agent to be supplied to the NSR catalyst 4.

When the exhaust gas passes through the three way catalyst 3 or the NSR catalyst 4, NOx contained in the exhaust gas is reacted with HC or $H_2$ to produce ammonia ($NH_3$) in some cases. For example, if $H_2$ is produced from CO and $H_2O$ contained in the exhaust gas in accordance with the water gas shift reaction or the steam reforming reaction, $H_2$ is reacted with NO to produce $NH_3$ in the three way catalyst 3 or the NSR catalyst 4. In this embodiment, the three way catalyst 3 or the NSR catalyst 4 corresponds to the exhaust gas purification catalyst according to the present invention. In this embodiment, an explanation is made assuming that the NSR catalyst 4 is the exhaust gas purification catalyst. However, a consideration can be also made in the same manner as described above if the three way catalyst 3 is regarded as the exhaust gas purification catalyst.

The SCR catalyst 5 adsorbs the reducing agent beforehand, and the SCR catalyst 5 selectively reduces NOx by using the adsorbed reducing agent when NOx passes therethrough. $NH_3$, which is produced by the three way catalyst 3 or the NSR catalyst 4, can be utilized as the reducing agent supplied to the SCR catalyst 5.

Further, a first temperature sensor 11 for detecting the temperature of the exhaust gas and an air-fuel ratio sensor 12 for detecting the air-fuel ratio of the exhaust gas are attached to the exhaust gas passage 2 at positions disposed downstream from the three way catalyst 3 and upstream from the NSR catalyst. The temperature of the three way catalyst 3 or the temperature of the NSR catalyst 4 can be detected by the first temperature sensor 11. Further, the air-fuel ratio of the exhaust gas of the internal combustion engine 1 or the air-fuel ratio of the exhaust gas allowed to flow into the NSR catalyst 4 can be detected by using the air-fuel ratio sensor 12.

Further, a second temperature sensor 13 for detecting the temperature of the exhaust gas is attached to the exhaust gas passage 2 at a position disposed downstream from the NSR catalyst 4 and upstream from the SCR catalyst 5. The temperature of the NSR catalyst 4 or the temperature of the SCR catalyst 5 can be detected by using the second temperature sensor 13.

Further, a third temperature sensor 14 for detecting the temperature of the exhaust gas is attached to the exhaust gas passage 2 at a position disposed downstream from the SCR catalyst 5. The temperature of the SCR catalyst 5 can be detected by the third temperature sensor 14. Further, the temperatures of the NSR catalyst 4 and the SCR catalyst 5 are changed depending on the operation state of the internal combustion engine 1 (for example, the load exerted on the internal combustion engine 1). Therefore, it is also allowable to estimate the temperatures of the NSR catalyst 4 and the SCR catalyst 5 depending on the operation state of the internal combustion engine 1. Further, it is also allowable that temperature sensors are directly attached to the NSR catalyst 4 and the SCR catalyst 5 to detect the temperatures of the NSR catalyst 4 and the SCR catalyst 5.

Further, it is also allowable that NOx sensors for detecting the NOx concentrations in the exhaust gas are attached on the upstream side and the downstream side of each of the catalysts. It is not necessarily indispensable that all of the sensors as described above should be attached. It is also allowable that the sensor or sensors is/are attached while being appropriately selected.

Further, an injection valve 6, which supplies the fuel to the internal combustion engine 1, is attached to the internal combustion engine 1.

On the other hand, an intake gas passage 7 is connected to the internal combustion engine 1. A throttle 8, which adjusts the intake air amount of the internal combustion engine 1, is provided at an intermediate position of the intake gas passage 7. Further, an air flow meter 15, which detects the intake air amount of the internal combustion engine 1, is attached to the intake gas passage 7 at a position upstream from the throttle 8.

ECU 10, which is an electronic control unit for controlling the internal combustion engine 1, is provided in combination with the internal combustion engine 1 constructed as described above. ECU 10 controls the internal combustion engine 1 in accordance with the operation condition of the internal combustion engine 1 and the request of a driver.

Further, other than the sensors described above, those connected via electric wirings to ECU 10 include an accelerator opening degree sensor 17 which outputs an electric signal corresponding to the amount of pedaling of an accelerator pedal 16 by the driver to detect the engine load and a crank position sensor 18 which detects the number of revolutions of the engine. The output signals of the various sensors are inputted into ECU 10.

On the other hand, the injection valve 6 and the throttle 8 are connected via electric wirings to ECU 10. The opening/closing timing of the injection valve 6 and the opening degree of the throttle 8 are controlled by ECU 10.

ECU 10 determines the required intake air amount, for example, from the accelerator opening degree detected by the accelerator opening degree sensor 17 and the number of revolutions of the engine detected by the crank position sensor 18. Then, the opening degree of the throttle 8 is controlled so that the intake air amount detected by the air flow meter 15 becomes the required intake air amount. The injection valve 6 is controlled so that the fuel injection amount, which corresponds to the intake air amount changed at that time, is supplied. The air-fuel ratio, which is set at that time, is the air-fuel ratio which is set corresponding to the operation state of the internal combustion engine 1. The lean burn operation is performed for the internal combustion engine 1 according to this embodiment. However, the internal combustion engine 1 is operated in some cases in the vicinity of the theoretical air-fuel ratio, for example, during the high load operation.

Thus, ECU 10 carries out the reducing process for NOx occluded by the NSR catalyst 4. When NOx occluded by the NSR catalyst 4 is reduced, the so-called rich spike, in which the air-fuel ratio of the exhaust gas allowed to flow into the NSR catalyst 4, is lowered to a predetermined rich air-fuel ratio, is carried out by adjusting the amount of the fuel injected from the injection valve 6 or the opening degree of the throttle 8.

The rich spike is carried out, for example, when the NOx amount occluded by the NSR catalyst 4 becomes a predetermined amount. The NOx amount occluded by the NSR catalyst 4 is calculated, for example, by adding-up the differences between the NOx amount allowed to flow into the NSR catalyst 4 and the NOx amount allowed to flow out from the NSR catalyst 4. The NOx amount allowed to flow into the NSR catalyst 4 and the NOx amount allowed to flow out from the NSR catalyst 4 can be detected by attaching sensors. Further, it is also allowable that the rich spike is performed depending on the travel distance of the vehicle which carries the internal combustion engine 1. Further, it is also allowable that the rich spike is performed on the basis of the NOx amount maximally occludable by the NSR catalyst 4. This feature will be described later on.

Further, in order to recover the NSR catalyst 4 from the sulfur poisoning, ECU 10 carries out the sulfur poisoning recovery process for the NSR catalyst 4. The sulfur poisoning recovery process is carried out by setting the air-fuel ratio to a predetermined rich air-fuel ratio after raising the temperature of the NSR catalyst 4 to a temperature (for example, not less than 650° C.) required for the recovery from the sulfur poisoning.

In this procedure, if the air-fuel ratio is excessively lowered during the sulfur poisoning recovery process, it is feared that the amounts of emission of HC and CO may be increased and/or $H_2S$ may be produced. For this reason, the air-fuel ratio is set to an air-fuel ratio of about 14.3 which is approximate to the theoretical air-fuel ratio during the sulfur poisoning recovery process. The rich air-fuel ratio, which is approximate to the theoretical air-fuel ratio as described above, is hereinafter referred to as "weakly rich air-fuel ratio". It is also allowable that the weakly rich air-fuel ratio is, for example, the air-fuel ratio which is the rich air-fuel ratio and which makes it possible to purify HC and CO by using the three way catalyst 3. It is possible to perform the recovery from the sulfur poisoning even in the case of the theoretical air-fuel ratio. Therefore, it is also allowable that the theoretical air-fuel ratio is included in the weakly rich air-fuel ratio.

However, even when the sulfur poisoning recovery process is carried out by providing the weakly rich air-fuel ratio, it is difficult to remove all of the sulfur component. Therefore, the sulfur component, which is not removed even when the sulfur poisoning recovery process is carried out, is gradually accumulated, and the NOx purification rate of the NSR catalyst 4 is lowered or deteriorated. Further, the production amount of $NH_3$ is also decreased by the sulfur poisoning. Therefore, the NOx purification rate of the SCR catalyst 5 is also lowered by the sulfur component which is not removed by using the weakly rich air-fuel ratio.

For this reason, in this embodiment, in order to remove the sulfur component which is accumulated in the NSR catalyst 4 without being removed at the weakly rich air-fuel ratio, the air-fuel ratio is set, for example, to 12.5 to carry out the sulfur poisoning recovery process. The relatively low rich air-fuel ratio, which is included in the rich air-fuel ratio as described above, is hereinafter referred to as "strongly rich air-fuel ratio". The strongly rich air-fuel ratio is the air-fuel ratio which is lower than the weakly rich air-fuel ratio. It is also allowable that the strongly rich air-fuel ratio is, for example, the air-fuel ratio at which all of the sulfur component accumulated in the NSR catalyst 4 can be removed or the air-fuel ratio at which almost all of the sulfur component accumulated in the NSR catalyst 4 can be removed.

That is, in this embodiment, the sulfur poisoning recovery process is ordinarily carried out at the weakly rich air-fuel ratio, and the sulfur poisoning recovery process is carried out at the strongly rich air-fuel ratio when the sulfur component is accumulated.

Figure 2:
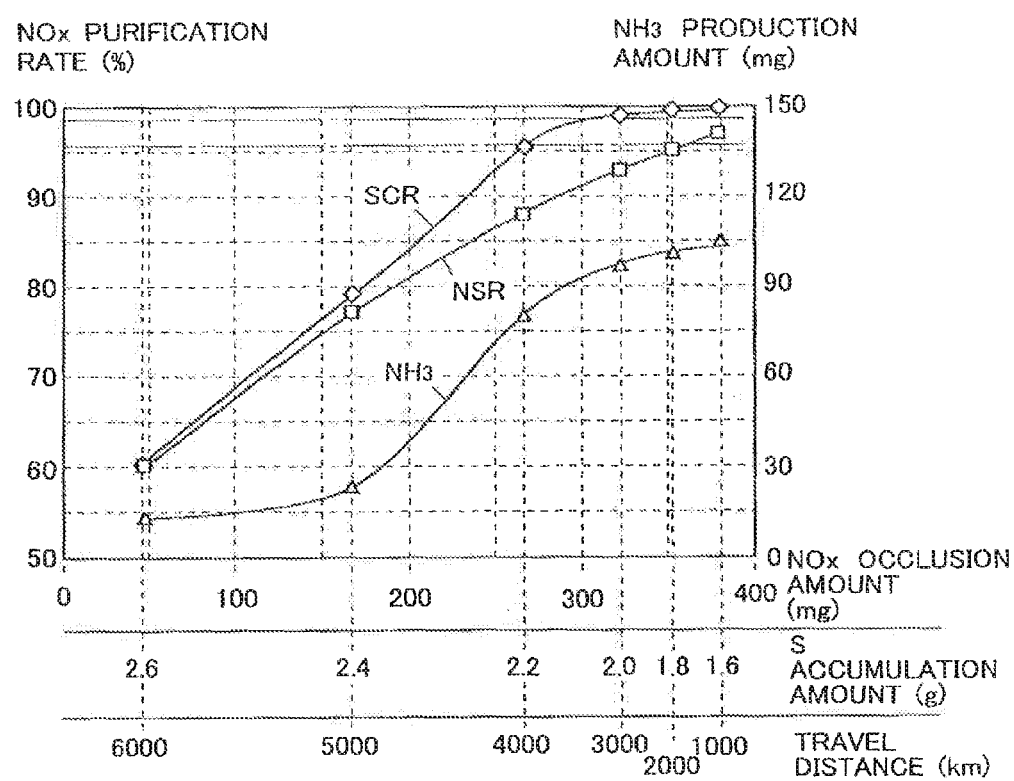
FIG. 2 shows the transition of the NOx purification rate provided on the downstream side from an NSR catalyst, the NOx purification rate provided on the downstream side from an SCR catalyst, and the $NH_3$ production amount provided by the NSR catalyst, when the rich spike is carried out while setting the period of time of the lean air-fuel ratio to 80 seconds and setting the period of time of the rich air-fuel ratio to 2.2 seconds.
Figure 3:
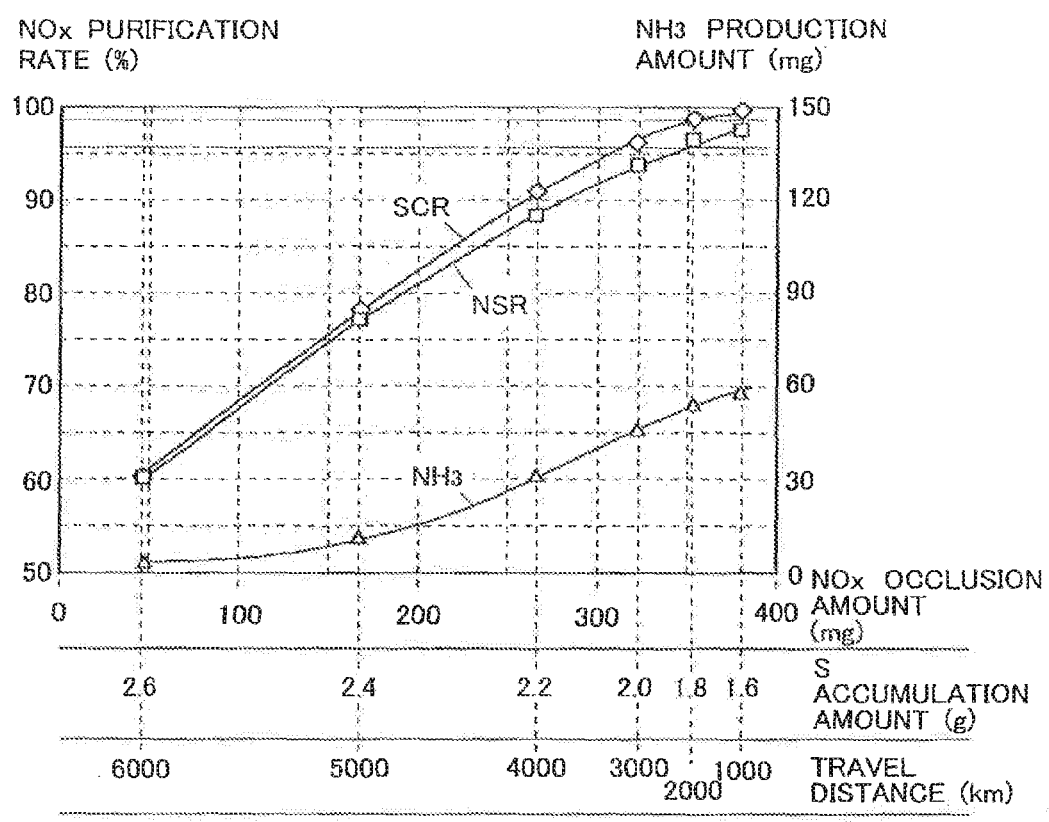
FIG. 3 shows the transition of the NOx purification rate provided on the downstream side from the NSR catalyst, the NOx purification rate provided on the downstream side from the SCR catalyst, and the $NH_3$ production amount provided by the NSR catalyst, when the rich spike is carried out while setting the period of time of the lean air-fuel ratio to 40 seconds and setting the period of time of the rich air-fuel ratio to 2.2 seconds.

In this context, FIG. 2 shows the transition of the NOx purification rate provided on the downstream side from an NSR catalyst 4, the NOx purification rate provided on the downstream side from the SCR catalyst 5, and the $NH_3$ production amount provided by the NSR catalyst 4, when the rich spike is carried out while setting the period of time of the lean air-fuel ratio to 80 seconds and setting the period of time of the rich air-fuel ratio to 2.2 seconds. That is, FIG. 2 is the drawing provided when the interval of the rich spike is 80 seconds and the time of the rich spike is 2.2 seconds. On the other hand, FIG. 3 shows the transition of the NOx purification rate provided on the downstream side from the NSR catalyst 4, the NOx purification rate provided on the downstream side from the SCR catalyst 5, and the $NH_3$ production amount provided by the NSR catalyst 4, when the rich spike is carried out while setting the period of time of the lean air-fuel ratio to 40 seconds and setting the period of time of the rich air-fuel ratio to 2.2 seconds. That is, FIG. 3 is the drawing provided when the interval of the rich spike is 40 seconds and the time of the rich air-fuel ratio is 2.2 seconds. The rich spike is repeatedly executed.

In FIGS. 2 and 3, the horizontal axis represents the travel distance of the vehicle, the NOx amount (NOx occlusion amount or NOx storage amount) maximally occludable by the NSR catalyst 4, and the amount of the sulfur component (S accumulation amount) accumulated in the NSR catalyst 4 and incapable of being removed at the weakly rich air-fuel ratio. As for the fuel used, the concentration of the sulfur component is 37 ppm. Further, the sulfur poisoning recovery process is carried out at the weakly rich air-fuel ratio every time when the travel distance of the vehicle reaches 1000 km. The reason, why the sulfur poisoning recovery process is carried out at the weakly rich air-fuel ratio every time when the travel distance reaches 1000 km, is that it is intended to prevent the NOx purification rate from being outside the allowable range due to the sulfur poisoning. The travel distance, at which the sulfur poisoning recovery process is carried out, changes depending on the concentration of the sulfur component contained in the fuel to be used.

"NSR" shown in FIGS. 2 and 3 indicates the NOx purification rate provided on the downstream side from the NSR catalyst 4 and on the upstream side from the SCR catalyst 5. It is also allowable that this means the ratio of the NOx amount subjected to the purification until the passage through the NSR catalyst 4 with respect to the NOx amount emitted from the internal combustion engine 1. "NSR" is hereinafter referred to as "NOx purification rate of the NSR catalyst 4" as well. "SCR" shown in FIGS. 2 and 3 indicates the NOx purification rate provided on the downstream side from the SCR catalyst 5. It is also allowable that this means the ratio of the NOx amount subjected to the purification until the passage through the SCR catalyst 5 with respect to the NOx amount emitted from the internal combustion engine 1. Further, it is also allowable that "SCR" means the NOx purification rate provided for the entire system. "SCR" is hereinafter referred to as "NOx purification rate of the entire system" as well. Further, "$NH_3$" shown in FIGS. 2 and 3 is the amount of $NH_3$ produced by the NSR catalyst 4 when the rich spike is performed once.

The S accumulation amount on the horizontal axis indicates the amount of the sulfur component progressively accumulated without being removed even when the sulfur poisoning recovery process is carried out at the weakly rich air-fuel ratio. Even if the sulfur poisoning recovery process is carried out every time when the travel distance reaches 1000 km, then the S accumulation amount is increased, for example, by 0.2 g every time when the vehicle travels 1000 km. Further, the NOx occlusion amount on the horizontal axis represents the NOx amount maximally occludable by the NSR catalyst 4. The NOx occlusion amount is decreased by the sulfur component which is not removed even when the sulfur poisoning recovery process is carried out at the weakly rich air-fuel ratio.

In FIGS. 2 and 3, the alternate long and short dash line indicates the threshold value of the allowable range of the NOx purification rate, and the NOx purification rate, which is not less than the value indicated by the alternate long and short dash line, is required. That is, if "SCR" is not less than the alternate long and short dash line, the NOx purification rate is within the allowable range. The threshold value of the NOx purification rate is altered depending on, for example, laws and regulations. In FIGS. 2 and 3, the two threshold values are shown.

In this context, when FIG. 2 and FIG. 3 are compared with each other, the NOx purification rate, which is provided downstream from the NSR catalyst 4 shown in FIG. 3, is higher than that shown in FIG. 2. That is, if the time of the lean air-fuel ratio is shorter, the NOx purification rate of the NSR catalyst 4 is higher. In this way, when the interval of the rich spike is more shortened, the NOx purification rate of the NSR catalyst 4 is more raised.

On the other hand, as for the $NH_3$ production amount, the $NH_3$ production amount shown in FIG. 2 is larger. That is, when the time of the lean air-fuel ratio is longer, the $NH_3$ production amount is more increased. As described above, when the interval of the rich spike is more lengthened, the $NH_3$ production amount is more increased. When the $NH_3$ production amount is increased, it is thereby possible to supply a larger amount of the reducing agent to the SCR catalyst 5. Therefore, it is possible to raise the NOx purification rate of the SCR catalyst 5.

That is, when the interval of the rich spike is changed, the NOx purification rates, which are provided by the NSR catalyst 4 and the SCR catalyst 5, are thereby changed respectively. In the case of any one of FIGS. 2 and 3, if the travel distance is short, the NOx purification rate of the entire system is high. However, if the travel distance becomes long, the NOx purification rate of the entire system becomes higher in the situation shown in FIG. 2.

In order to maintain the NOx purification rate of the entire system to be not less than the threshold value, it is appropriate that the sulfur poisoning recovery process is carried out at the strongly rich air-fuel ratio when the NOx purification rate of the entire system is on the threshold value.

Figure 4:
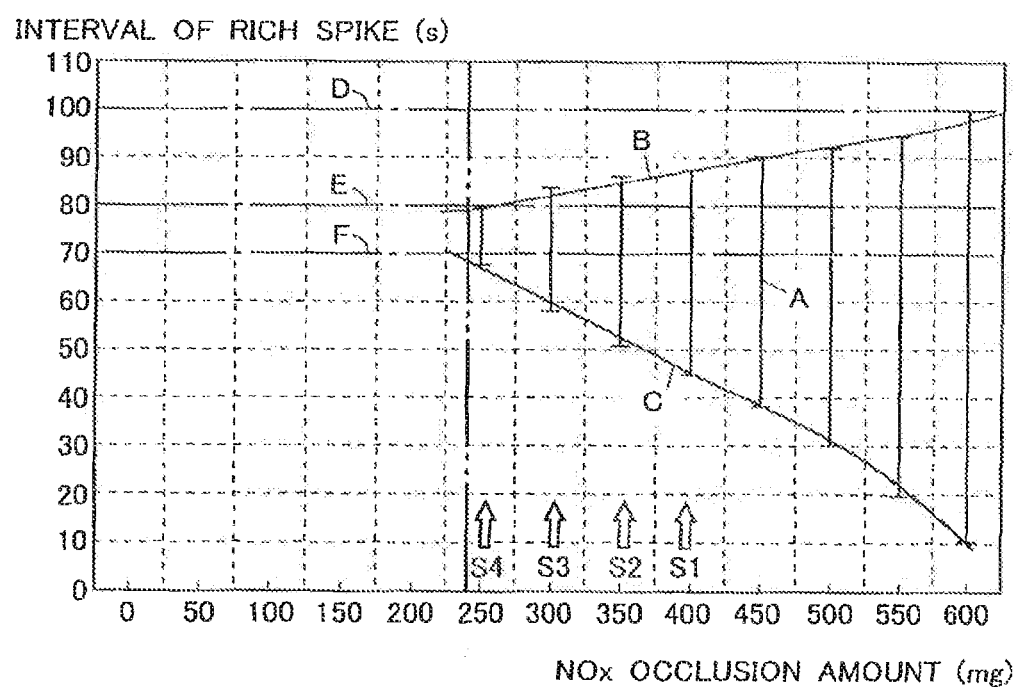
FIG. 4 shows the relationship between the maximally occludable NOx amount (NOx occlusion amount) by the NSR catalyst and the interval of the rich spike.

The foregoing features are summarized in FIG. 4. FIG. 4 shows the relationship between the maximally occludable NOx amount (NOx occlusion amount) by the NSR catalyst 4 and the interval of the rich spike. The relationship shown in FIG. 4 is the relationship which is determined while considering the decrease in the NOx occlusion amount caused by the accumulation of the sulfur component incapable of being removed with the weakly rich air-fuel ratio, the deterioration of the fuel efficiency (fuel consumption) caused by the rich spike, and the decrease in the $NH_3$ production amount.

In FIG. 4, A indicates the range of the interval of the rich spike capable of being set when each of the NOx occlusion amounts is provided. That is, A indicates the range of the interval of the rich spike capable of being set corresponding to the NOx amount maximally occludable by the NSR catalyst 4. The smaller the NOx occlusion amount is, the narrower the range is. That is, when the NOx occlusion amount is more decreased, then the upper limit value B of the interval of the rich spike is more decreased, and the lower limit value C is more increased.

Further, the alternate long and short dash lines D, E, F shown in FIG. 4 indicate the degrees of deterioration of the fuel efficiency caused by the rich spike, wherein the deterioration of the fuel efficiency occurs by 0.8% in the case of D, 1.0% in the case of E, and 1.1% in the case of F.

Then, the interval of the rich spike is determined in accordance with the relationship shown in FIG. 4, and thus the NOx purification rate of the entire system can be maintained to be high. In relation to the interval of the rich spike capable of being set, the longer the interval of the rich spike is, the more improved the fuel efficiency (fuel consumption) is. Therefore, it is also allowable that the interval of the rich spike is made to be the longest of the intervals of the rich spike capable of being set. That is, it is appropriate that the interval of the rich spike has the value on the line indicated by B depending on the NOx occlusion amount. By doing so, the smaller the NOx amount maximally occludable by the NSR catalyst 4 is, the shorter the interval of the rich spike is. For example, the interval of the rich spike is 88 seconds when the NOx occlusion amount is 400 mg. The interval of the rich spike is 86 seconds in the case of 350 mg, and the interval of the rich spike is 84 seconds in the case of 300 mg.

It is also allowable that the NOx amount maximally occludable by the NSR catalyst 4 is the NOx amount occluded when the NOx concentration in the exhaust gas allowed to flow out from the NSR catalyst 4 exceeds an allowable range. Further, it is also allowable that the NOx amount maximally occludable by the NSR catalyst 4 is the NOx amount occluded until NOx cannot be occluded after the execution of the rich spike. Further, it is also allowable that the NOx amount maximally occludable by the NSR catalyst 4 is the NOx amount occluded until the NOx purification rate is less than a threshold value after the execution of the previous rich spike control. Further, the NOx amount occluded by the NSR catalyst 4 can be calculated as the difference between the NOx amount allowed to flow into the NSR catalyst 4 and the NOx amount allowed to flow out from the NSR catalyst 4. The NOx amount allowed to flow into the NSR catalyst 4 and the NOx amount allowed to flow out from the NSR catalyst 4 can be calculated respectively from the intake air amount and the NOx concentration. Further, it is also allowable that the NOx concentration in the exhaust gas allowed to flow into the NSR catalyst 4 is estimated on the basis of the operation state of the internal combustion engine 1.

In this procedure, the sulfur poisoning recovery process is carried out before the NOx purification rate of the entire system becomes less than the threshold value. Therefore, for example, when the fuel containing the sulfur component of 37 ppm is used, the sulfur poisoning recovery process is carried out every time when the vehicle travels 1000 km, in order to suppress the emission of the harmful component. Further, the NOx occlusion amount, which is provided every time when the vehicle travels 1000 km, corresponds to S1, S2, S3, S4 shown in FIG. 4. That is, if the sulfur poisoning recovery process is carried out every time when the NOx occlusion amount is S1, S2, S3, S4, the sulfur poisoning recovery process is carried out every time when the vehicle travels 1000 km.

The recovery from the sulfur poisoning can be carried out at the appropriate timing by carrying out the sulfur poisoning recovery process when the NOx occlusion amount as described above is provided. Further, it is possible to suppress the deterioration of the fuel efficiency (fuel consumption), and it is possible to sufficiently purify the harmful component contained in the exhaust gas even when the sulfur component remains in the NSR catalyst 4.

When the NOx occlusion amount of S1, S2, S3, S4 is provided as shown in FIG. 4, the sulfur poisoning recovery process is carried out at the weakly rich air-fuel ratio. Therefore, the sulfur component is accumulated in the NSR catalyst 4. Then, if the NOx occlusion amount is smaller than the amount provided in the vicinity of 250 mg (see the alternate long and two short dashes line shown in FIG. 4), the amount of emission of the harmful component contained in the exhaust gas exceeds an allowable range.

Therefore, in this embodiment, the sulfur poisoning recovery process is carried out at the strongly rich air-fuel ratio when the NOx occlusion amount of S3 shown in FIG. 4 is provided. Accordingly, almost all of the sulfur component accumulated in the NSR catalyst 4 can be removed. Therefore, the sulfur poisoning recovery process is carried out next time when the NOx occlusion amount of S1 is provided. That is, the sulfur poisoning recovery process is carried out at the weakly rich air-fuel ratio in the case of S1, S2, and the sulfur poisoning recovery process is carried out at the strongly rich air-fuel ratio in the case of S3.

In this procedure, when the sulfur poisoning recovery process is carried out at the strongly rich air-fuel ratio, the air-fuel ratio is lowered as compared with the air-fuel ratio at which HC and CO can be purified by the three way catalyst 3. Therefore, the amounts of emission of HC and CO are increased. Further, it is feared that $H_2S$ may be produced from the released sulfur component. Therefore, the sulfur poisoning recovery process is carried out at the weakly rich air-fuel ratio in the case of S1 and S2 shown in FIG. 4 in which the NOx amount maximally occludable by the NSR catalyst 4 is sufficiently within the allowable range. Further, the sulfur poisoning recovery process is carried out at the strongly rich air-fuel ratio only in the case of the NOx occlusion amount of S3 shown in FIG. 4 in which it is feared that the NOx amount maximally occludable by the NSR catalyst 4 may be outside the allowable range. Accordingly, it is possible to reduce the amounts of emission of HC, CO, $H_2S$.

Figure 5:
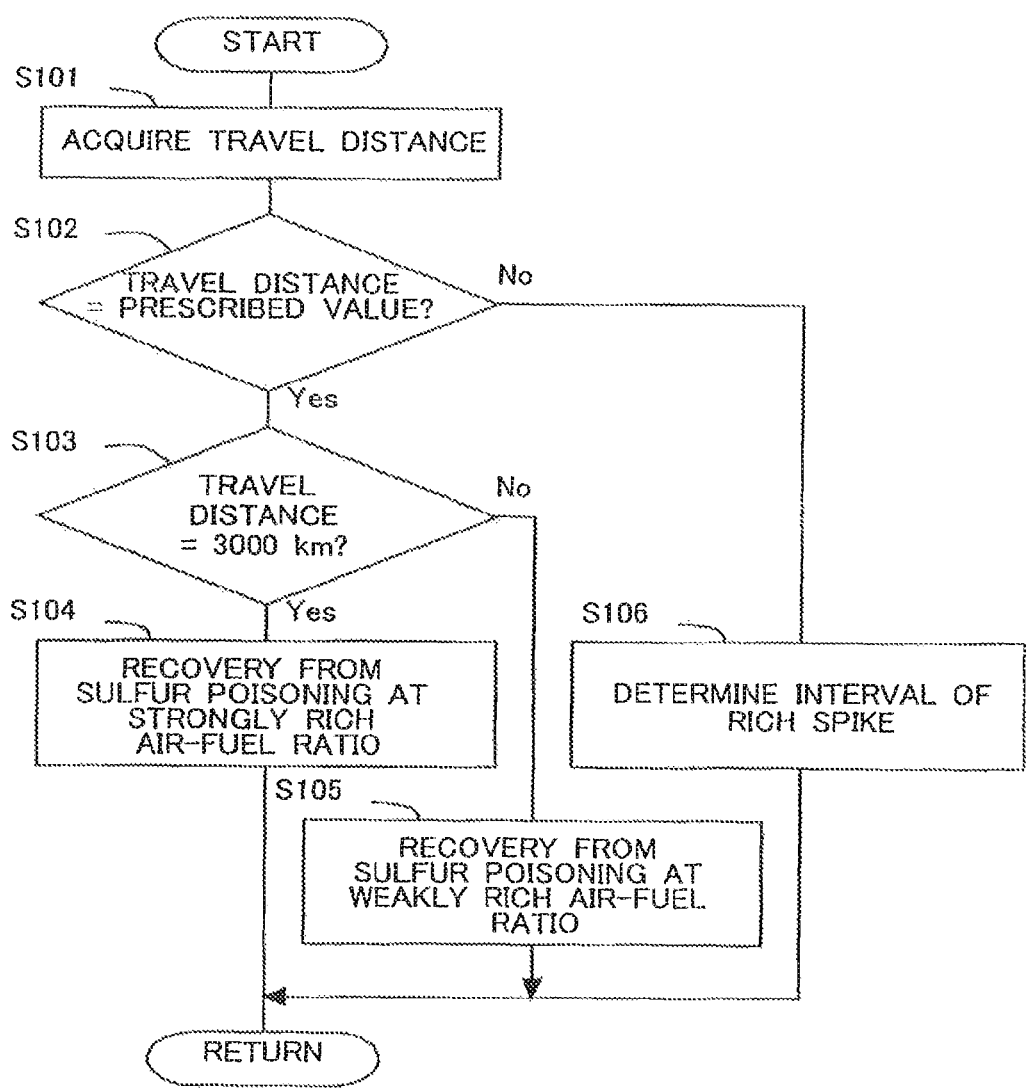
FIG. 5 shows a flow chart illustrating a flow of a sulfur poisoning recovery process according to a first embodiment.

FIG. 5 shows a flow chart illustrating a flow of the sulfur poisoning recovery process according to this embodiment. This routine is executed by ECU 10 every time when a predetermined time elapses.

In Step S101, the travel distance of the vehicle is acquired. The travel distance of the vehicle is acquired as the value correlated with the NOx amount maximally occludable by the NSR catalyst 4. Further, the travel distance of the vehicle is also acquired as the value correlated with the amount of the sulfur component occluded by the NSR catalyst 4. In this step, it is also allowable to detect the NOx amount maximally occludable by the NSR catalyst 4, or it is also allowable to acquire the value correlated with the NOx amount maximally occludable by the NSR catalyst 4.

In Step S102, it is judged whether or not the travel distance of the vehicle is a prescribed value. In this step, for example, it is judged whether or not the travel distance of the vehicle is an integral multiple of 1000 km. In this procedure, it is also allowable to judge whether or not the travel distance of the vehicle is within a predetermined range including the integral multiple of 1000 km. In this step, it is judged whether or not the recovery from the sulfur poisoning of the NSR catalyst 4 is required. It is also allowable to judge whether or not the recovery from the sulfur poisoning of the NSR catalyst 4 is required on the basis of the NOx amount maximally occludable by the NSR catalyst 4. For example, it is also allowable to judge whether or not the NOx amount maximally occludable by the NSR catalyst 4 is less than a threshold value. The travel distance, at which the sulfur poisoning recovery process is carried out, is changed depending on the concentration of the sulfur component contained in the fuel. Therefore, it is also allowable to change the judgment condition depending on the concentration of the sulfur component contained in the fuel capable of being supplied.

If the affirmative judgment is made in Step S102, the routine proceeds to Step S103. On the other hand, if the negative judgment is made, the routine proceeds to Step S106.

In Step S103, it is judged whether or not the vehicle travels 3000 km after the completion of the previous sulfur poisoning recovery process. In this situation, it is also allowable to judge whether or not the travel distance of the vehicle, which is provided after the completion of the previous sulfur poisoning recovery process, is within a predetermined range including 3000 km. In this step, it is also allowable to judge whether or not the NOx amount maximally occludable by the NSR catalyst 4 is less than a threshold value. In this step, it is judged whether or not the accumulation amount of the sulfur component incapable of being removed with the weakly rich air-fuel ratio exceeds the allowable range. If the affirmative judgment is made in Step S103, the routine proceeds to Step S104. On the other hand, if the negative judgment is made, the routine proceeds to Step S105. In this embodiment, ECU 10, which executes the process of Step S103, corresponds to the control unit according to the present invention.

In Step S104, the sulfur poisoning recovery process is carried out at the strongly rich air-fuel ratio. That is, the process is carried out in order to remove all of the sulfur component from the NSR catalyst 4. In this embodiment, Step S104 corresponds to the second control according to the present invention.

In Step S105, the sulfur poisoning recovery process is carried out at the weakly rich air-fuel ratio. In this situation, the sulfur component remains in the NSR catalyst 4. However, the amounts of emission of HC, CO, $H_2S$ are suppressed. In this embodiment, Step S105 corresponds to the first control according to the present invention.

It is also allowable that the weakly rich air-fuel ratio is selected if the NOx amount maximally occludable by the NSR catalyst 4 is not less than the threshold value, while the strongly rich air-fuel ratio is selected if the NOx amount maximally occludable by the NSR catalyst 4 is less than the threshold value to carry out the sulfur poisoning recovery process.

In Step S106, the interval of the rich spike is determined. The rich spike is performed in order to reduce NOx occluded by the NSR catalyst 4 and supply $NH_3$ to the SCR catalyst 5. The interval of the rich spike is determined by using the relationship shown in FIG. 4 depending on the travel distance or the NOx occlusion amount. When the sulfur poisoning recovery process is not carried out, the rich spike is carried out at the interval determined in this step. The rich spike is carried out for the time corresponding to the NOx occlusion amount.

In the flow shown in FIG. 5, the weakly rich air-fuel ratio or the strongly rich air-fuel ratio is selected depending on the travel distance of the vehicle on which the internal combustion engine 1 is carried. However, in place thereof, it is also allowable that the weakly rich air-fuel ratio or the strongly rich air-fuel ratio is selected by using any other value correlated with the amount of the sulfur component which is accumulated in the NSR catalyst 4 and which cannot be removed at the weakly rich air-fuel ratio. For example, it is also allowable that the weakly rich air-fuel ratio or the strongly rich air-fuel ratio is selected depending on the purification performance of the NSR catalyst 4 or the number of times of the execution of the sulfur poisoning recovery process.

For example, the following procedure is also available. That is, in Step S101 described above, the number of times of the execution of the sulfur poisoning recovery process is acquired. In Step S103, the routine proceeds to Step S104 if the number of times of the execution of the sulfur poisoning recovery process including this time is a multiple of 3, while the routine proceeds to Step S105 if the number of times is any number other than the above. Further, for example, the following procedure is also available. That is, the process is repeated, in which the sulfur poisoning recovery process is carried out twice at the weakly rich air-fuel ratio, and then the sulfur poisoning recovery process is carried out once at the strongly rich air-fuel ratio.

Further, it is also allowable that the purification performance of the NSR catalyst 4 is judged on the basis of the NOx purification rate of the NSR catalyst 4, the NOx occlusion amount of the NSR catalyst 4, the oxygen occlusion amount of the NSR catalyst 4, or the $NH_3$ production amount of the NSR catalyst 4. The NOx purification rate of the NSR catalyst 4, the NOx occlusion amount of the NSR catalyst 4, the oxygen occlusion amount of the NSR catalyst 4, and the $NH_3$ production amount of the NSR catalyst 4 may be acquired in accordance with any well-known technique. For example, the following procedure is also available. That is, in Step S101 described above, the NOx purification rate of the NSR catalyst 4 is acquired. In Step S103 described above, the routine proceeds to Step S104 if the NOx purification rate is less than a threshold value, while the routine proceeds to Step S105 if the NOx purify rate is not less than the threshold value. Further, for example, the following procedure is also available. That is, in Step S101 described above, the NOx amount maximally occludable by the NSR catalyst 4 is acquired. In Step S103 described above, the routine proceeds to Step S104 if the NOx amount maximally occludable by the NSR catalyst 4 is less than a threshold value, while the routine proceeds to Step S105 if the NOx amount is not less than the threshold value. Further, for example, the following procedure is also available. That is, in Step S101 described above, the oxygen occlusion amount of the NSR catalyst 4 is acquired. In Step S103 described above, the routine proceeds to Step S104 if the oxygen occlusion amount of the NSR catalyst 4 is less than a threshold value, while the routine proceeds to Step S105 if the oxygen occlusion amount of the NSR catalyst 4 is not less than the threshold value. Further, for example, the following procedure is also available. That is, in Step S101 described above, the $NH_3$ production amount of the NSR catalyst 4 is acquired. In Step S103 described above, the routine proceeds to Step S104 if the $NH_3$ production amount of the NSR catalyst 4 is less than a threshold value, while the routine proceeds to Step S105 if the $NH_3$ production amount of the NSR catalyst 4 is not less than the threshold value.

When the sulfur poisoning recovery process is carried out at the strongly rich air-fuel ratio, it is also allowable that the air-fuel ratio is relatively lowered, for example, to 12.5 from the beginning. Alternatively, it is also allowable that the sulfur component is firstly released at the weakly rich air-fuel ratio, and then the air-fuel ratio is set to the strongly rich air-fuel ratio to release the sulfur component corresponding to the amount of accumulation. That is, it is also allowable that the sulfur poisoning recovery process is carried out at the weakly rich air-fuel ratio, and then the sulfur poisoning recovery process is carried out continuously at the strongly rich air-fuel ratio.

Figure 6:
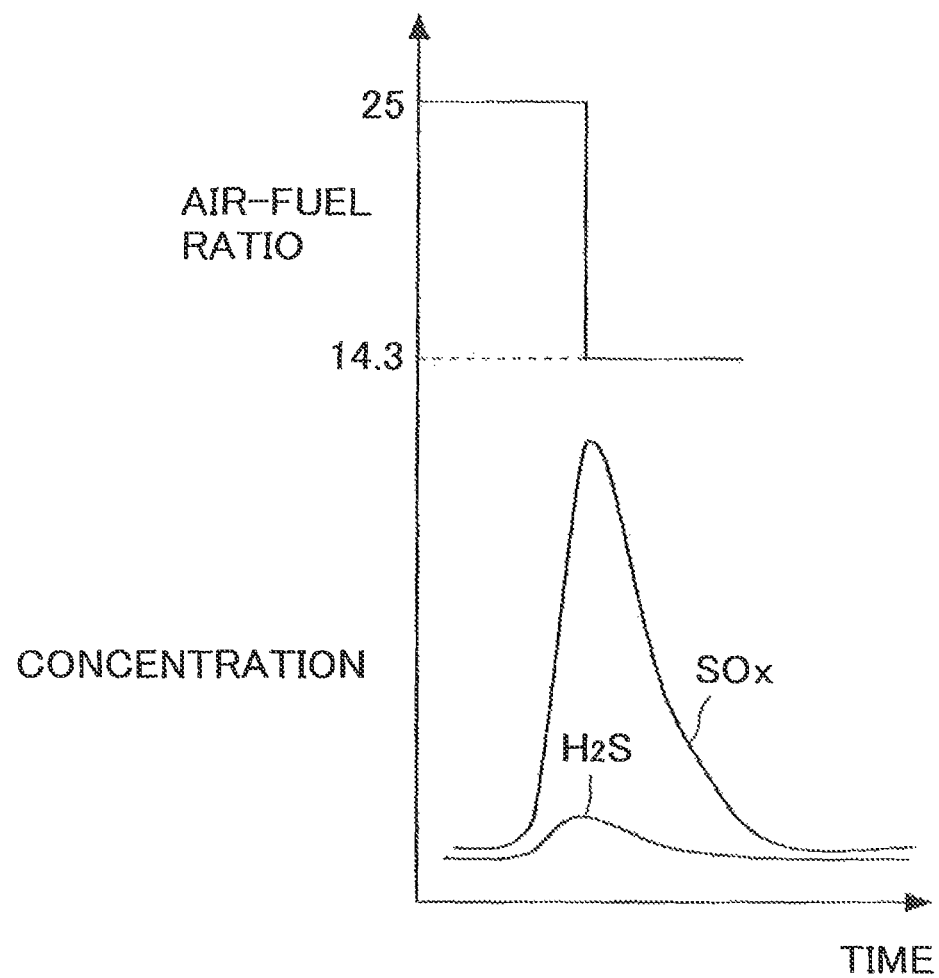
FIG. 6 shows a time chart illustrating the transition of the air-fuel ratio, the SOx concentration, and the $H_2S$ concentration, when the sulfur poisoning recovery process is carried out at the weakly rich air-fuel ratio.
Figure 7:
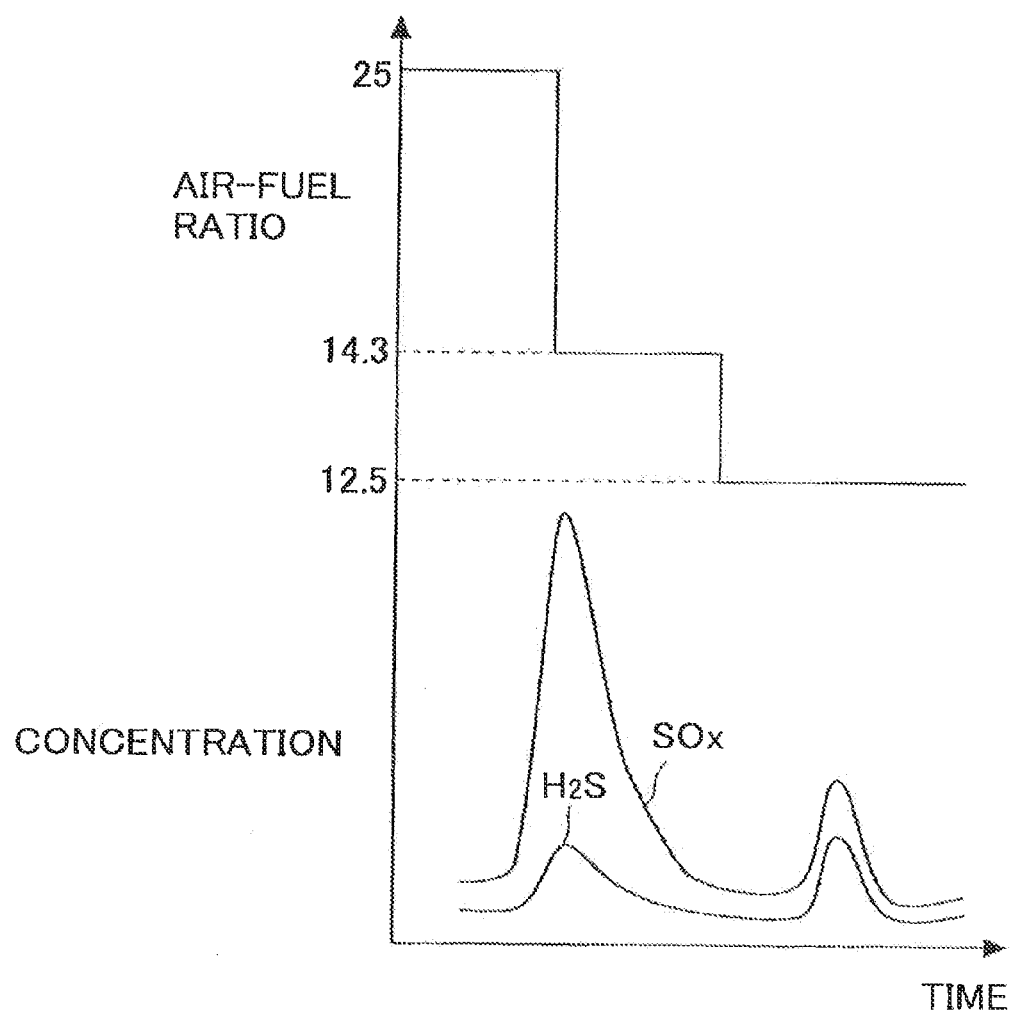
FIG. 7 shows a time chart illustrating the transition of the air-fuel ratio, the SOx concentration, and the $H_2S$ concentration, when the sulfur poisoning recovery process is carried out at the weakly rich air-fuel ratio and then the sulfur poisoning recovery process is continuously carried out at the strongly rich air-fuel ratio.

In this context, FIG. 6 shows a time chart illustrating the transition of the air-fuel ratio, the SOx concentration, and the $H_2S$ concentration, when the sulfur poisoning recovery process is carried out at the weakly rich air-fuel ratio. Further, FIG. 7 shows a time chart illustrating the transition of the air-fuel ratio, the SOx concentration, and the $H_2S$ concentration, when the sulfur poisoning recovery process is carried out at the weakly rich air-fuel ratio and then the sulfur poisoning recovery process is continuously carried out at the strongly rich air-fuel ratio. In FIGS. 6 and 7, the air-fuel ratio is the air-fuel ratio of the gas emitted or discharged from the internal combustion engine 1 or the air-fuel ratio of the gas allowed to flow into the NSR catalyst 4. Further, the SOx concentration and the $H_2S$ concentration are the values obtained on the downstream side from the NSR catalyst 4. In FIG. 6, the period of time, in which the weakly rich air-fuel ratio is provided, is, for example, 30 minutes at the maximum. Further, in FIG. 7, the period of time, in which the weakly rich air-fuel ratio is provided, is, for example, 30 minutes at the maximum, and the period of time, in which the strongly rich air-fuel ratio is provided, is, for example, 2.5 minutes at the maximum.

When the rich air-fuel ratio is provided, the SOx concentration is raised by the sulfur component released from the NSR catalyst 4. In this situation, if the weakly rich air-fuel ratio is provided, the amount of produced $H_2S$ is relatively small with respect to the amount of released SOx. That is, the ratio of the $H_2S$ concentration with respect to the SOx concentration is low. In this way, when the weakly rich air-fuel ratio is provided, the amount of production of $H_2S$ is suppressed.

On the other hand, when the strongly rich air-fuel ratio is provided, the amount of produced $H_2S$ is relatively large with respect to the amount of released SOx. That is, the ratio of the $H_2S$ concentration with respect to the SOx concentration is raised. In this way, when the sulfur poisoning recovery process is performed, $H_2S$ is produced more easily if the strongly rich air-fuel ratio is provided as compared with if the weakly rich air-fuel ratio is provided. For this reason, when the sulfur component accumulated in the NSR catalyst 4 is removed, if the sulfur poisoning recovery process is carried out at the strongly rich air-fuel ratio from the beginning, then the amount of production of $H_2S$ is increased.

In this context, when the NOx occlusion amount shown by S3 in FIG. 4 is given, then a large amount of the sulfur component, which cannot be removed with the strongly rich air-fuel ratio, is accumulated, but a certain amount of the sulfur component, which can be removed even with the weakly rich air-fuel ratio, is also occluded. Therefore, when the sulfur poisoning recovery process is once carried out at the weakly rich air-fuel ratio beforehand, the sulfur component, which can be removed with the weakly rich air-fuel ratio, can be previously removed. In this situation, it is possible to suppress the amount of production of $H_2S$. Further, when the recovery from the sulfur poisoning is performed with the strongly rich air-fuel ratio continuously thereto, then the strongly rich air-fuel ratio is provided in the state in which the amount of the sulfur component remaining in the NSR catalyst 4 is small, and hence the amount of production of $H_2S$ is decreased.

That is, if the sulfur poisoning recovery process is carried out at the strongly rich air-fuel ratio from the beginning, then $H_2S$, which corresponds to all of the amount of the sulfur component occluded by the NSR catalyst 4, is produced, and hence a relatively large amount of $H_2S$ is produced. On the other hand, if the weakly rich air-fuel ratio is firstly provided, and the strongly rich air-fuel ratio is thereafter provided, then $H_2S$ is produced corresponding to the amount of the sulfur component which is included in the sulfur component occluded by the NSR catalyst 4 and which cannot be removed with the weakly rich air-fuel ratio. Therefore, the amount of production of $H_2S$ is relatively small. Similarly, it is also possible to decrease the amounts of emission of HC and CO.

For example, it is also allowable that the sulfur poisoning recovery process is carried out at the weakly rich air-fuel ratio until the sulfur component is not released, and then the sulfur poisoning recovery process is performed continuously at the strongly rich air-fuel ratio. In this way, the time, for which the sulfur poisoning recovery process is carried out at the strongly rich air-fuel ratio, is shortened. Thus, it is possible to reduce the amounts of emission of HC, CO, and $H_2S$.

When the sulfur poisoning recovery process is carried out at the strongly rich air-fuel ratio, it is also allowable that the reference value of the air-fuel ratio is, for example, 20, and the air-fuel ratio is, for example, 12.5 for a short time at a predetermined interval. That is, it is also possible to perform the sulfur poisoning recovery process by frequently providing the strongly rich air-fuel ratio from the lean air-fuel ratio. For example, it is also allowable to provide the strongly rich air-fuel ratio before the storage amount of oxygen of the NSR catalyst 4 arrives at an upper limit.

Figure 8:
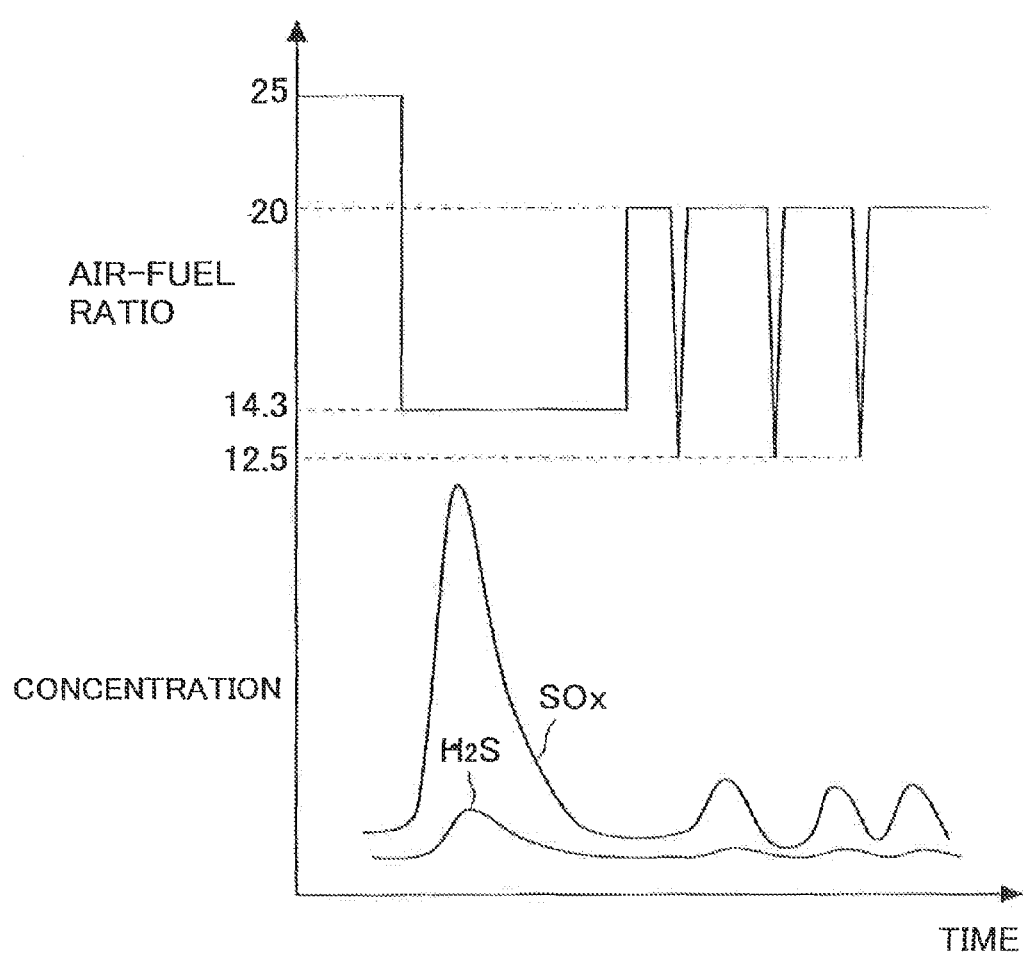
FIG. 8 shows a time chart illustrating the transition of the air-fuel ratio, the SOx concentration, and the $H_2S$ concentration, when the sulfur poisoning recovery process is carried out, for example, at an air-fuel ratio of 14.3, the air-fuel ratio is thereafter raised, for example, to 20 continuously, and the sulfur poisoning recovery process is carried out while setting the air-fuel ratio, for example, to 12.5 for a short time at a predetermined interval during the period in which the air-fuel ratio is 20.

FIG. 8 shows a time chart illustrating the transition of the air-fuel ratio, the SOx concentration, and the $H_2S$ concentration, when the sulfur poisoning recovery process is carried out, for example, at an air-fuel ratio of 14.3, the air-fuel ratio is thereafter raised, for example, to 20 continuously, and the sulfur poisoning recovery process is carried out while setting the air-fuel ratio, for example, to 12.5 for a short time at a predetermined interval during the period in which the air-fuel ratio is 20. The time, for which the air-fuel ratio is, for example, 12.5, is, for example, 1.4 seconds.

When the sulfur poisoning recovery process is carried out as described above, oxygen is supplied to the NSR catalyst 4 when the air-fuel ratio is, for example, 20. Therefore, the temperature of each of the catalysts is easily raised. Therefore, even when the time, for which the rich air-fuel ratio is provided, is short, it is possible to promptly release the sulfur component.

Further, the time, for which the lean air-fuel ratio is provided, is given. Therefore, it is possible to decrease the amounts of emission of HC and CO as compared with a case in which the strongly rich air-fuel ratio is provided continuously. Similarly, it is also possible to reduce the amounts of emission of $H_2S$ and NOx.

Second Embodiment

In this embodiment, the timing of the sulfur poisoning recovery process is changed depending on by which portion of the NSR catalyst 4 the sulfur component is occluded. Other devices or the like are the same as those of the first embodiment, any explanation of which will be omitted.

Figure 9:
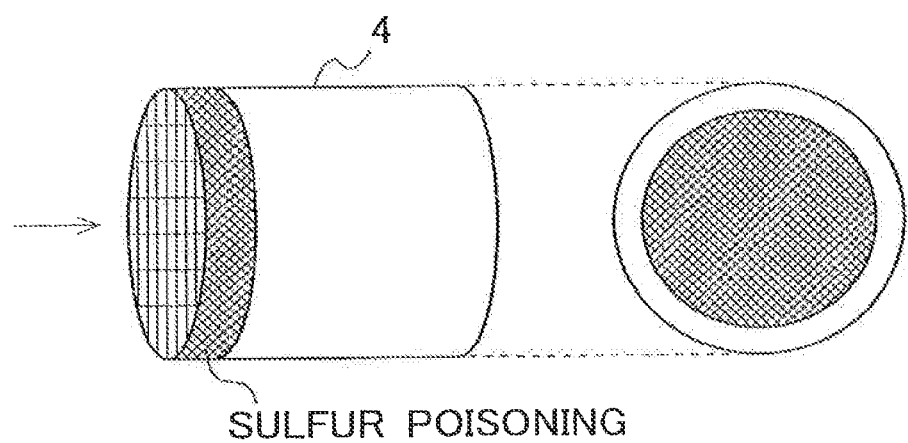
FIG. 9 shows the sulfur poisoning portion of the NSR catalyst when SV is relatively low.
Figure 10:
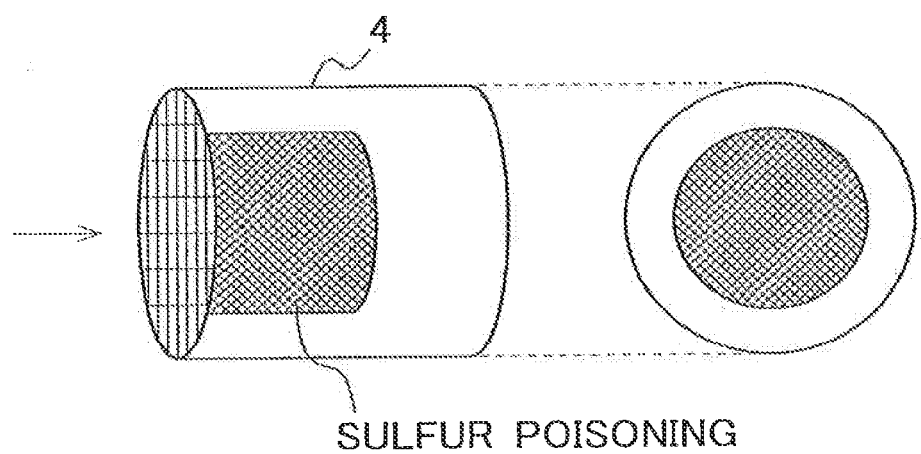
FIG. 10 shows the sulfur poisoning portion of the NSR catalyst when SV is relatively high.
Figure 11:
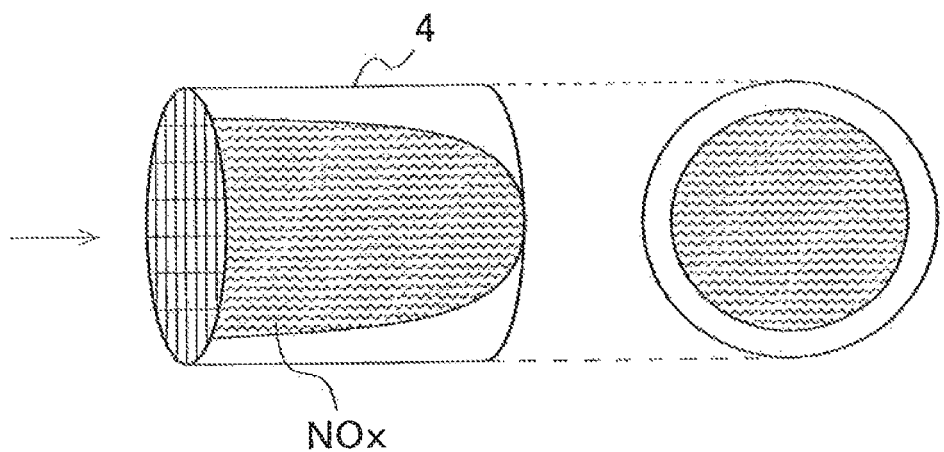
FIG. 11 shows the NOx occlusion portion of the NSR catalyst when SV is relatively low.
Figure 12:
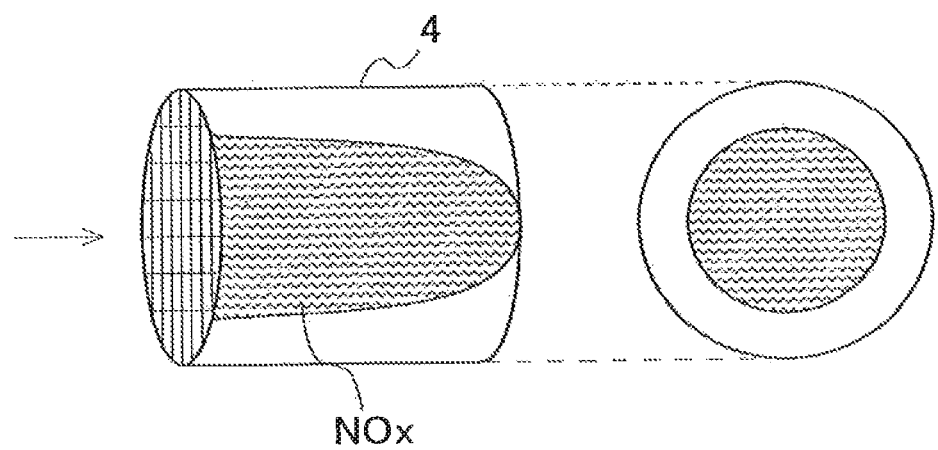
FIG. 12 shows the NOx occlusion portion of the NSR catalyst when SV is relatively high.

In this context, FIG. 9 shows the sulfur poisoning portion of the NSR catalyst 4 when the space velocity (SV) is relatively low. FIG. 10 shows the sulfur poisoning portion of the NSR catalyst 4 when SV is relatively high. FIG. 11 shows the NOx occlusion portion of the NSR catalyst 4 when SV is relatively low. FIG. 12 shows the NOx occlusion portion of the NSR catalyst 4 when SV is relatively high. In FIGS. 9 to 12, the arrows show the flow direction of the exhaust gas. Further, in FIGS. 9 to 12, the drawing shown on the left side is the drawing in which the NSR catalyst 4 is viewed in the transverse direction (lateral direction), and the drawing shown on the right side is the drawing in which the NSR catalyst 4 is viewed from the upstream side of the exhaust gas. It is also allowable that SV is changed with the load exerted on the internal combustion engine 1, the flow velocity of the exhaust gas, or the flow rate of the exhaust gas.

In this procedure, in the case of the low load of the internal combustion engine 1, the space velocity (SV) is lowered, and the exhaust gas flows while being spread in the radial direction. That is, the exhaust gas flows similarly or identically in the vicinity of the central axis of the NSR catalyst 4 and in the vicinity of the outer circumference thereof. Therefore, the sulfur component is occluded uniformly in a region ranging from the central axis to the outer circumference. Further, the sulfur component is principally occluded on the upstream side of the NSR catalyst 4. NOx is also occluded while being spread in the radial direction of the NSR catalyst 4 in the same manner as described above.

Further, the portion, at which the sulfur poisoning occurs, is disposed only on the upstream side of the NSR catalyst 4. Therefore, a large amount of NOx can be occluded in a wide region or range disposed on the downstream side therefrom.

That is, in the case of the low load exerted on the internal combustion engine 1, it is possible to occlude NOx even when the amount of the occluded sulfur component is large. Therefore, it is appropriate that the sulfur poisoning recovery process is carried out, for example, when 2.5 g of the sulfur component is occluded.

On the other hand, in the case of the middle load or the high load of the internal combustion engine 1, the inertial force of the exhaust gas is increased, and the exhaust gas flows principally in the vicinity of the central axis of the NSR catalyst 4. Therefore, the sulfur component is occluded while being biased or deviated on the central axis side of the NSR catalyst 4. Then, a large amount of the sulfur component flows into the portion disposed in the vicinity of the central axis of the NSR catalyst 4, and thus the sulfur poisoning advances quickly in the vicinity of the central axis. Therefore, the sulfur component is also occluded on the downstream side. Further, NOx is also occluded by the portion disposed in the vicinity of the central axis of the NSR catalyst 4 in the same manner as described above. However, the portion, at which the sulfur poisoning arises, is spread to the downstream side of the NSR catalyst 4. Therefore, the occludable NOx amount is smaller than that provided in the case of the low load.

That is, in the case of the middle load or the high load of the internal combustion engine 1, it is feared that NOx may be unable to be occluded even when the amount of occluded sulfur component is small. Therefore, it is appropriate that the sulfur poisoning recovery process is carried out, for example, when 0.7 g of the sulfur component is occluded.

As described above, when the middle load or the high load is applied, the sulfur poisoning recovery process is carried out in the state in which the occlusion amount of the sulfur component is small, as compared with when the low load is applied. It is also appropriate that the lower SV is, the longer the interval of the sulfur poisoning recovery process is.

Further, in this embodiment, the interior of the NSR catalyst 4 is divided into a plurality of portions, and the occlusion amount of the sulfur component is determined for each of the portions.

Figure 13:
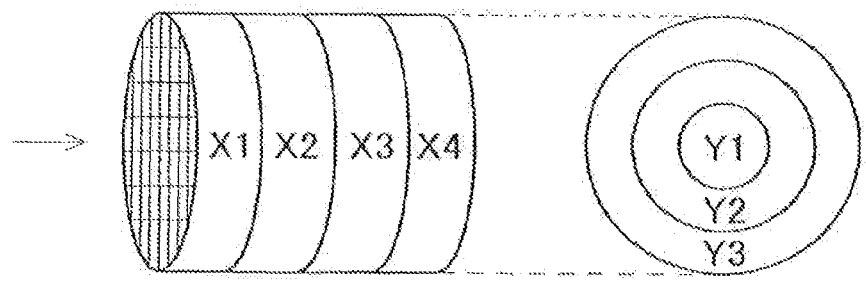
FIG. 13 shows the way of division of the interior of the NSR catalyst.
Figure 14:
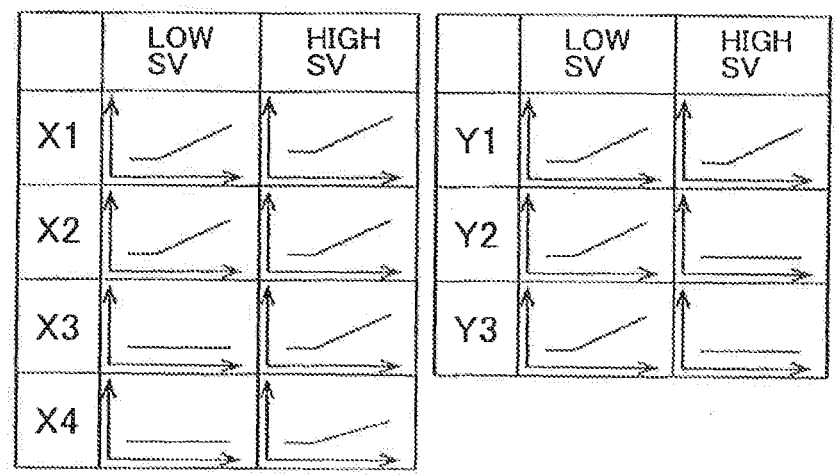
FIG. 14 shows those directed to calculate the distribution coefficient as the value correlated with the amount of the sulfur component occluded by each of the portions.

In this context, FIG. 13 shows the way of division of the interior of the NSR catalyst 4. FIG. 14 shows those directed to calculate the distribution coefficient as the value correlated with the amount of the sulfur component occluded by each of the portions. In FIG. 13, the arrow indicates the flow direction of the exhaust gas. Further, in FIG. 13, the drawing shown on the left side is the drawing in which the NSR catalyst 4 is viewed in the transverse direction (lateral direction), and the drawing shown on the right side is the drawing in which the NSR catalyst 4 is viewed from the upstream side of the exhaust gas.

As shown in FIG. 13, the NSR catalyst 4 is divided in the flow direction of the exhaust gas into four, i.e., X1, X2, X3, X4, and the NSR catalyst 4 is divided in the radial direction into three, i.e., Y1, Y2, Y3. Therefore, a consideration is made while dividing the NSR catalyst 4 into twelve portions in total. In this embodiment, a consideration is made while dividing the NSR catalyst 4 into twelve portion. However, it is also allowable that a consideration is made while dividing the NSR catalyst 4 into eleven or less portions, or a consideration is made while dividing the NSR catalyst 4 into thirteen or more portion.

FIG. 14 shows the transition of the counter correlated with the amount of the sulfur component adhered to the portions of X1 to X4 and portions of Y1 to Y3 in relation to the case in which SV is low (low SV) and the case in which SV is high (high SV) respectively. In this way, the counter, which corresponds to each of the portions of X1 to X4 and the portions of Y1 to Y3, is previously stored in ECU 10. The counter is previously set, for example, by means of an experiment so that the distribution coefficient, which is correlated with the amount of the sulfur component occluded by each of the portions, can be calculated by multiplying the value in the flow direction of the exhaust gas and the value in the radial direction of the NSR catalyst 4. The counter is set on the basis of FIGS. 9 and 10. In this embodiment, the division is made into those concerning the two, i.e., low SV and high SV. However, a consideration may be made while making the division into those concerning three or more.

In this procedure, as for the portion into which the sulfur component is allowed to flow, the longer the time is, the larger the occlusion amount of the sulfur component is. Therefore, the counter is increased in this situation. Further, in the case of low SV, the counter is increased on the upstream side in the flow direction in relation to the entire portion in the radial direction. On the other hand, in the case of high SV, the counter is increased for the entire portion in the flow direction in relation to the side of the central axis in the radial direction.

Further, it is also allowable to set the counter so that occlusion amount of the sulfur component of each of the portions can be calculated, for example, by multiplying the distribution coefficient and the SOx concentration in the exhaust gas allowed to flow into the NSR catalyst 4.

Further, the amount of the sulfur component, which is accumulated without being successfully removed by the sulfur poisoning recovery process at the weakly rich air-fuel ratio, can be also calculated on the basis of the amount of the sulfur component occluded by each of the portions. For example, it is also appropriate that the amount or the proportion of the sulfur component allowed to remain when the sulfur poisoning recovery process is carried out at the weakly rich air-fuel ratio is previously determined for each of the portions, for example, by means of an experiment.

Further, it is possible to estimate the NOx purification performance of each of the portions from the occlusion amount of the sulfur component of each of the portions. Further, it is also possible to estimate the NOx purification performance of the entire NSR catalyst 4. Then, it is possible to determine the timing at which the sulfur poisoning recovery process is carried out on the basis of the NOx purification performance of the entire NSR catalyst 4.

Figure 15:
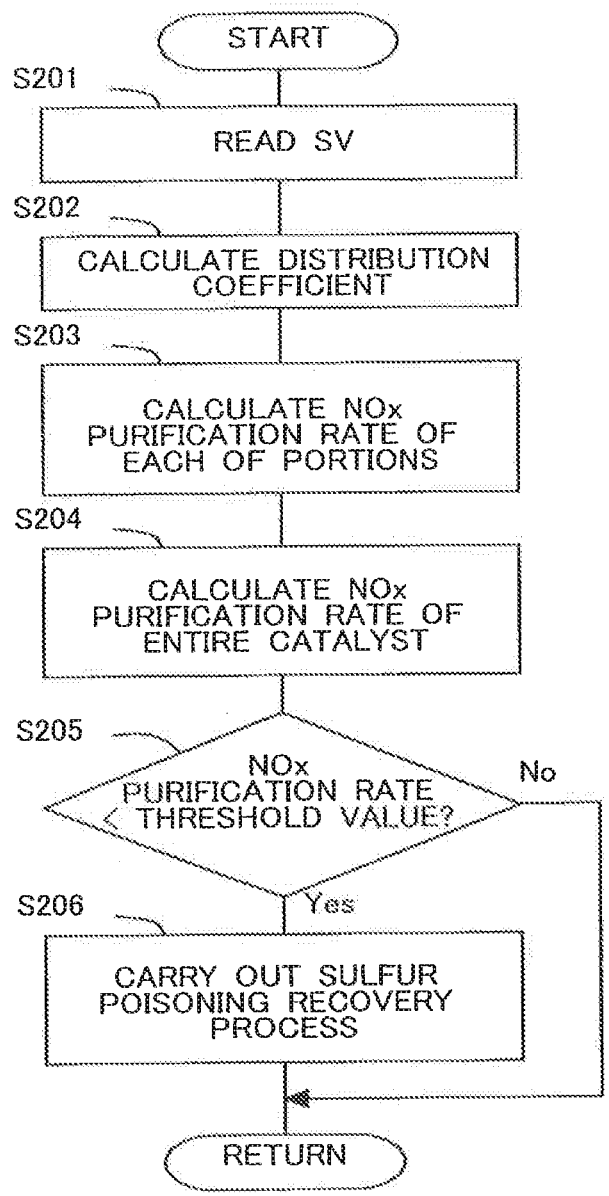
FIG. 15 shows a flow chart illustrating a flow of a sulfur poisoning recovery process according to a second embodiment.

FIG. 15 shows a flow chart illustrating a flow of a sulfur poisoning recovery process according to this embodiment. This routine is executed by ECU 10 every time when a predetermined time elapses.

In Step S201, SV is read. For example, SV is calculated from the intake air amount obtained by the air flow meter 15.

In Step S202, the distribution coefficient is calculated. In this embodiment, ECU 10, which processes Step S202, corresponds to the coefficient calculating unit according to the present invention.

In Step S203, the NOx purification rate of each of the portions of the NSR catalyst 4 is calculated on the basis of the distribution coefficient. The relationship between the distribution coefficient and the NOx purification rate is previously determined for each SV, for example, by means of an experiment, and the relationship is stored beforehand in ECU 10. In this embodiment, ECU 10, which processes Step S203, corresponds to the purification performance of each portion calculating unit according to the present invention.

In Step S204, the NOx purification rate of the entire NSR catalyst 4 is calculated. The NOx purification rate of the entire NSR catalyst 4 is calculated by adding the NOx purification rates of the respective portions. In this embodiment, ECU 10, which processes Step S204, corresponds to the entire purification performance calculating unit according to the present invention.

In Step S205, it is judged whether or not the NOx purification rate of the NSR catalyst 4 is less than a threshold value. The threshold value is the lower limit value of the NOx purification rate at which it is unnecessary to carry out the sulfur poisoning recovery process. If the affirmative judgment is made in Step S205, the routine proceeds to Step S206. On the other hand, if the negative judgment is made, this routine is completed.

In Step S206, the sulfur poisoning recovery process is executed. In this procedure, the time, for which the sulfur poisoning recovery process is carried out, is, for example, 10 minutes in the case of high SV, while the time is, for example, 30 minutes in the case of low SV. That is, in the case of high SV, even when the occlusion amount of the sulfur component is small, the sulfur poisoning recovery process is carried out. Therefore, the time, for which the sulfur poisoning recovery process is carried out, is shortened in conformity with the occlusion amount of the sulfur component. On the other hand, in the case of low SV, the sulfur poisoning recovery process is carried out after the occlusion amount of the sulfur component is increased. Therefore, the time, for which the sulfur poisoning recovery process is carried out, is prolonged in conformity with the occlusion amount of the sulfur component. Further, if the NOx purification rate is lowered to such an extent that it is necessary to carry out the sulfur poisoning recovery process at the strongly rich air-fuel ratio, the sulfur poisoning recovery process is carried out at the strongly rich air-fuel ratio.

Figure 16:
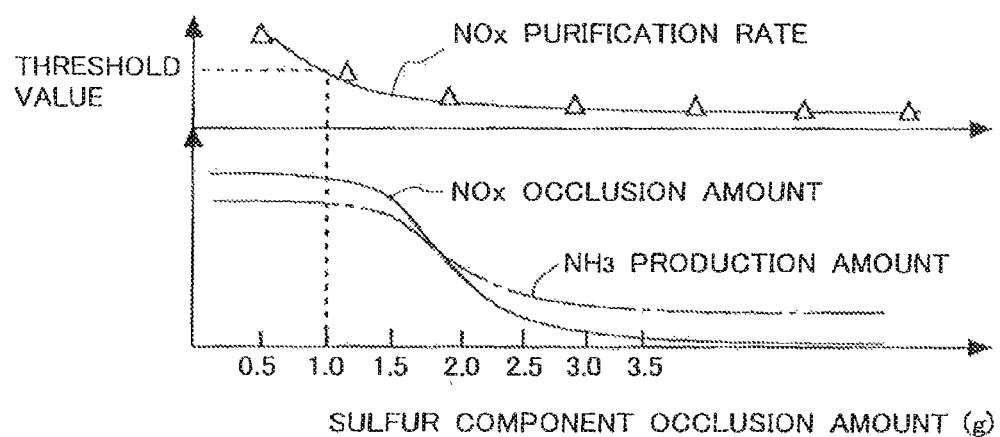
FIG. 16 shows the relationship among the occlusion amount of the sulfur component, the NOx purification rate, the NOx occlusion amount, and the $NH_3$ production amount in a situation of high SV.
Figure 17:
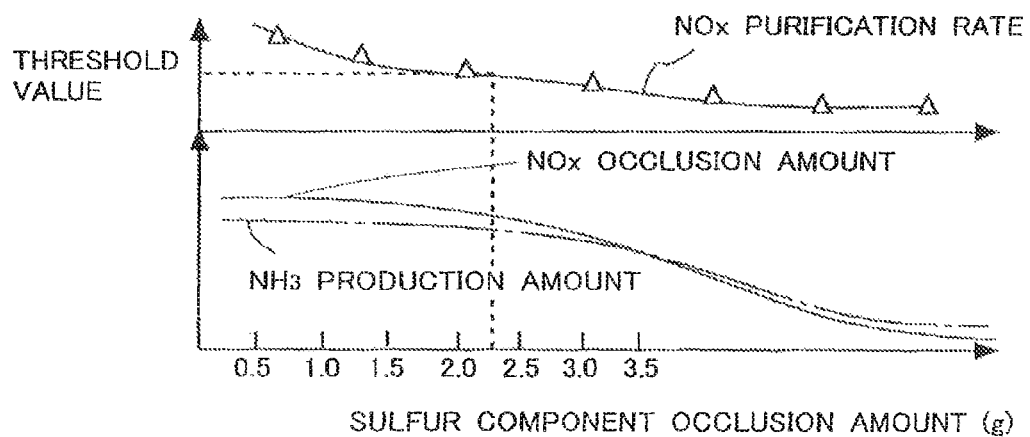
FIG. 17 shows the relationship among the occlusion amount of the sulfur component, the NOx purification rate, the NOx occlusion amount, and the $NH_3$ production amount in a situation of low SV.

FIG. 16 shows the relationship among the occlusion amount of the sulfur component, the NOx purification rate, the NOx occlusion amount, and the $NH_3$ production amount in a situation of high SV. FIG. 17 shows the relationship among the occlusion amount of the sulfur component, the NOx purification rate, the NOx occlusion amount, and the $NH_3$ production amount in a situation of low SV. In FIGS. 16 and 17, the NOx occlusion amount is the NOx amount maximally occludable by the NSR catalyst 4. Further, the NOx purification rate is the NOx purification rate of the entire system.

In this procedure, in the case of high SV, even when the occlusion amount of the sulfur component is small, then the NOx purification rate is lowered, and the NOx purification rate is outside the allowable range, for example, in the case of 1.0 g. Further, the NOx occlusion amount and the $NH_3$ production amount are also lowered immediately.

On the other hand, in the case of low SV, when the occlusion amount of the sulfur component exceeds, for example, 2.0 g, the NOx purification rate is outside the allowable range. Further, the NOx occlusion amount and the $NH_3$ production amount are not lowered immediately as well.

Therefore, it is also allowable to adopt the following procedure. That is, when the NOx purification rate is less than the threshold value, then the sulfur poisoning recovery process is carried out, and the time, for which the sulfur poisoning recovery process is carried out, is determined depending on each SV.

PARTS LIST

1: internal combustion engine, 2: exhaust gas passage, 3: three way catalyst, 4: storage reduction NOx catalyst (NOx storage reduction catalyst) (NSR catalyst), 5: selective catalytic reduction NOx catalyst (SCR catalyst), 6: injection valve, 7: intake gas passage, 8: throttle, 10: ECU, 11: first temperature sensor, 12: air-fuel ratio sensor, 13: second temperature sensor, 14: third temperature sensor, 15: air flow meter, 16: accelerator pedal, 17: accelerator opening degree sensor, 18: crank position sensor.

The invention claimed is:

1. An exhaust gas purification apparatus for an internal combustion engine, comprising:
    an exhaust gas purification catalyst which is provided at an exhaust gas passage of the internal combustion engine, for selectively executing:
    first control in which an air-fuel ratio of an exhaust gas allowed to flow into the exhaust gas purification catalyst is set to be not more than a theoretical air-fuel ratio to remove a sulfur component from the exhaust gas purification catalyst; and
    second control in which the air-fuel ratio of the exhaust gas allowed to flow into the exhaust gas purification catalyst is set to an air-fuel ratio that is lower than the air-fuel ratio of the exhaust gas set in the first control to remove the sulfur component from the exhaust gas purification catalyst, the exhaust gas purification apparatus for the internal combustion engine further comprising:
    a control unit which executes any one of the first control and the second control on the basis of at least one of purification performance of the exhaust gas purification catalyst, a travel distance of a vehicle that carries the internal combustion engine, and a number of times of removal of the sulfur component from the exhaust gas purification catalyst when the sulfur component is removed from the exhaust gas purification catalyst, wherein:
    the control unit raises a frequency of execution of the first control as compared with a frequency of execution of the second control.

2. The exhaust gas purification apparatus for the internal combustion engine according to claim 1, wherein the control unit executes the second control continuously after the first control when the second control is executed.

3. The exhaust gas purification apparatus for the internal combustion engine according to claim 1, wherein the control unit executes the first control if the purification performance of the exhaust gas purification catalyst is not less than a threshold value, while the control unit executes the second control if the purification performance of the exhaust gas purification catalyst is less than the threshold value.

4. The exhaust gas purification apparatus for the internal combustion engine according to claim 1, wherein the control unit determines the purification performance of the exhaust gas purification catalyst on the basis of at least one of a NOx purification rate of the exhaust gas purification catalyst, a NOx occlusion amount of the exhaust gas purification catalyst, an oxygen occlusion amount of the exhaust gas purification catalyst, and an $NH_3$ production amount of the exhaust gas purification catalyst.

5. The exhaust gas purification apparatus for the internal combustion engine according to claim 1, further comprising a selective catalytic reduction NOx catalyst which is provided on a downstream side from the exhaust gas purification catalyst and which uses $NH_3$ as a reducing agent.

6. The exhaust gas purification apparatus for the internal combustion engine according to claim 1, further comprising:
    a coefficient calculating unit which calculates a distribution coefficient on the basis of an operation state of the internal combustion engine, while dividing the exhaust gas purification catalyst into a plurality of portions in a flow direction of the exhaust gas and in a radial direction, the distribution coefficient being correlated with an amount of the sulfur component occluded by each of the portions;
    a purification performance of each portion calculating unit which calculates the purification performance of each of the portions from the distribution coefficient calculated by the coefficient calculating unit; and
    an entire purification performance calculating unit which calculates the purification performance of the entire exhaust gas purification catalyst from the purification performance of each of the portions calculated by the purification performance of each portion calculating unit.

* * * * *